US010415981B2

(12) United States Patent
Misawa et al.

(10) Patent No.: US 10,415,981 B2
(45) Date of Patent: Sep. 17, 2019

(54) ANOMALY ESTIMATION APPARATUS AND DISPLAY APPARATUS

(71) Applicant: DENSO CORPORATION, Kariya, Aichi-pref. (JP)

(72) Inventors: Hideaki Misawa, Kariya (JP); Masumi Egawa, Kariya (JP); Utsushi Sakai, Kariya (JP); Kentaro Hitomi, Kariya (JP); Yuki Shinohara, Kariya (JP); Kazuhito Takenaka, Kariya (JP); Masataka Mori, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 225 days.

(21) Appl. No.: 15/658,199

(22) Filed: Jul. 24, 2017

(65) Prior Publication Data

US 2018/0023965 A1  Jan. 25, 2018

(30) Foreign Application Priority Data

Jul. 25, 2016 (JP) .................................. 2016-145563
May 1, 2017 (JP) .................................. 2017-091228

(51) Int. Cl.
  *G01C 21/34* (2006.01)
  *G06N 5/04* (2006.01)
  (Continued)

(52) U.S. Cl.
  CPC ..... *G01C 21/3415* (2013.01); *G01C 21/3602* (2013.01); *G01C 21/367* (2013.01);
  (Continued)

(58) Field of Classification Search
  CPC ............ G01C 21/3415; G01C 21/3602; G01C 21/356; G01C 21/3697; G06N 5/04; G06N 7/005
  (Continued)

(56) References Cited

U.S. PATENT DOCUMENTS

2007/0028219 A1* 2/2007 Miller .................. G05B 23/021
                                                   717/124
2017/0123428 A1* 5/2017 Levinson ............. G05D 1/0214
2017/0351261 A1* 12/2017 Levinson ................ G01S 17/42

FOREIGN PATENT DOCUMENTS

JP    H09-115087     5/1997
JP    2005-242424    9/2005
         (Continued)

OTHER PUBLICATIONS

Semiotic Prediction of Driving Behavior using Unsupervised Double Articulation Analyzer (T. Taniguchi et al, IEEE Intelligent Vehicles Symposium, 2012).

(Continued)

*Primary Examiner* — Tan Q Nguyen
(74) *Attorney, Agent, or Firm* — Knobbe, Martens, Olson & Bear, LLP

(57) ABSTRACT

An anomaly estimation apparatus includes a collection section that collects vehicle data, a feature amount calculation section that calculates a feature amount from the vehicle data and stores the feature amount and a place corresponding thereto, an anomaly determination section that determines whether an anomaly occurrence point is present based on the feature amount, an accumulation section that, if the anomaly occurrence point is present, uses the vehicle data at the anomaly occurrence point and an anomaly periphery point to generate estimation data, an information generation section that uses the estimation data to generate causality information representing causality between an anomaly caused at the anomaly occurrence point and an anomaly caused at the anomaly periphery point, and an estimation section that, if the anomaly occurrence point is present, uses the causality information to estimate transition of the anomaly from the anomaly occurrence point to the anomaly periphery point.

15 Claims, 21 Drawing Sheets

(51) Int. Cl.
    *G01C 21/36*     (2006.01)
    *G06N 7/00*     (2006.01)

(52) U.S. Cl.
    CPC ........... *G01C 21/3697* (2013.01); *G06N 5/04* (2013.01); *G06N 7/005* (2013.01)

(58) Field of Classification Search
    USPC ....................................................... 701/495
    See application file for complete search history.

(56) References Cited

FOREIGN PATENT DOCUMENTS

| | | |
|---|---|---|
| JP | 3792172 B2 | 7/2006 |
| JP | 2013-008148 | 1/2013 |
| JP | 2013-250663 | 12/2013 |
| JP | 2014-235605 | 12/2014 |

OTHER PUBLICATIONS

Contextual Scene Segmentation of Driving Behavior based on Double Articulation Analyzer (K. Takenaka et al, IEEE/RSJ International Conference on Intelligent Robots and Systems, 2012).

Latent Dirichlet Allocation (D. Blei et al, Journal of Machine Learning Research, 2003).

Finding Scientific Topics (T. Griffiths & M. Steyvers, Proceedings of the National Academy of Sciences, 2004).

\* cited by examiner

ANOMALY ESTIMATION APPARATUS AND DISPLAY APPARATUS

CROSS-REFERENCE TO RELATED APPLICATION

This application is based on and claims the benefit of priority from earlier Japanese Patent Applications No. 2016-145563 filed Jul. 25 2016 and No. 2017-91228 filed May 1 2017, the descriptions of which are incorporated herein by reference.

BACKGROUND

Technical Field

The present invention relates to an anomaly estimation apparatus that estimates a transition (transfer) of an anomaly and a display apparatus that displays the result of the estimation by the anomaly estimation apparatus.

Related Art

Japanese Patent No. 3792172 discloses a prediction apparatus that determines a time range having a travel time pattern similar to progress of travel time until now in a road section to be predicted, based on past travel time result data, and predicts subsequent travel time in the road section to be predicted, by referring to subsequent travel time result data in the determined time range.

In Japanese Patent No. 3792172, when a traffic hold-up occurs, since the traffic hold-up extends to a road section leading to the upper stream, not only the road section to be predicted but also a downstream road section connected to the road section to be predicted is also selected as a road section used for the prediction.

However, according to Japanese Patent No. 3792172, when an alternative route is calculated to avoid a traffic hold-up, routes from the current position to the destination point are required to be exhaustively generated to determine for every generated route whether or not a traffic hold-up has occurred.

SUMMARY

An embodiment provides an anomaly estimation apparatus that achieves quick calculation of an alternative route.

As an aspect of the embodiment, an anomaly estimation apparatus is provided which includes: a collection section that is configured to repeatedly collect vehicle data concerning conditions of a plurality of vehicles for the respective vehicles; a feature amount calculation section that is configured to calculate a feature amount from the vehicle data collected by the collection section and store the feature amount and a place corresponding to the feature amount in a state where the feature amount is associated with the place; an anomaly determination section that is configured to determine whether or not an anomaly occurrence point, at which an anomaly has occurred, is present at a present time based on the feature amount calculated by the feature amount calculation section; an accumulation section that is configured to, if the anomaly determination section determines that the anomaly occurrence point is present at the present time, use the vehicle data at the anomaly occurrence point and the vehicle data at an anomaly periphery point, which is a point around the anomaly occurrence point, to generate estimation data, which is previously set to estimate transition of the anomaly from the anomaly occurrence point to the anomaly periphery point, and store the generated estimation data; an information generation section that is configured to use the estimation data stored by the accumulation section to generate causality information representing causality between an anomaly that has occurred at the anomaly occurrence point and an anomaly that has occurred at the anomaly periphery point; and an estimation section that is configured to, if the anomaly determination section determines that the anomaly occurrence point is present at the present time, use the causality information generated by the information generation section in the past to estimate transition of the anomaly from the anomaly occurrence point, at which it is determined to be present at the present time by the anomaly determination section, to the anomaly periphery point.

DETAILED DESCRIPTION OF THE PREFERRED EMBODIMENTS

First Embodiment

Hereinafter, the first embodiment will be described with reference to the drawings.

Figure 1:
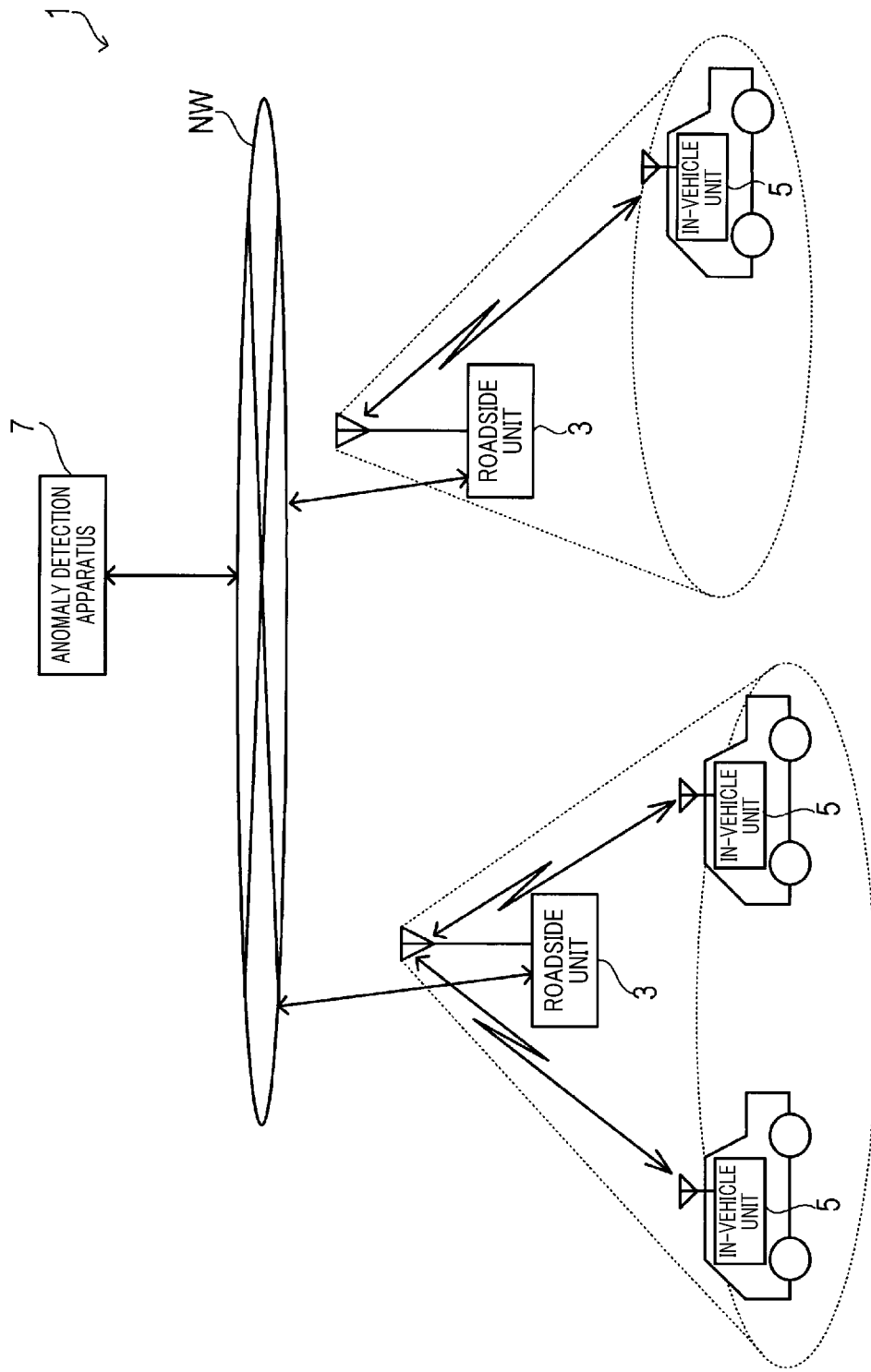
FIG. 1 is a diagram showing the configuration of an anomaly detection system.

As shown in FIG. 1, an anomaly detection system 1 of the present embodiment includes a plurality of roadside units 3 dispersedly disposed in the vicinity of a traveling path of automobiles, a plurality of in-vehicle units 5 that are installed in the automobiles to communicate by radio with the roadside units 3, and an anomaly detection apparatus 7 that is connected to the roadside units 3 via a wired network NW.

Figure 2:
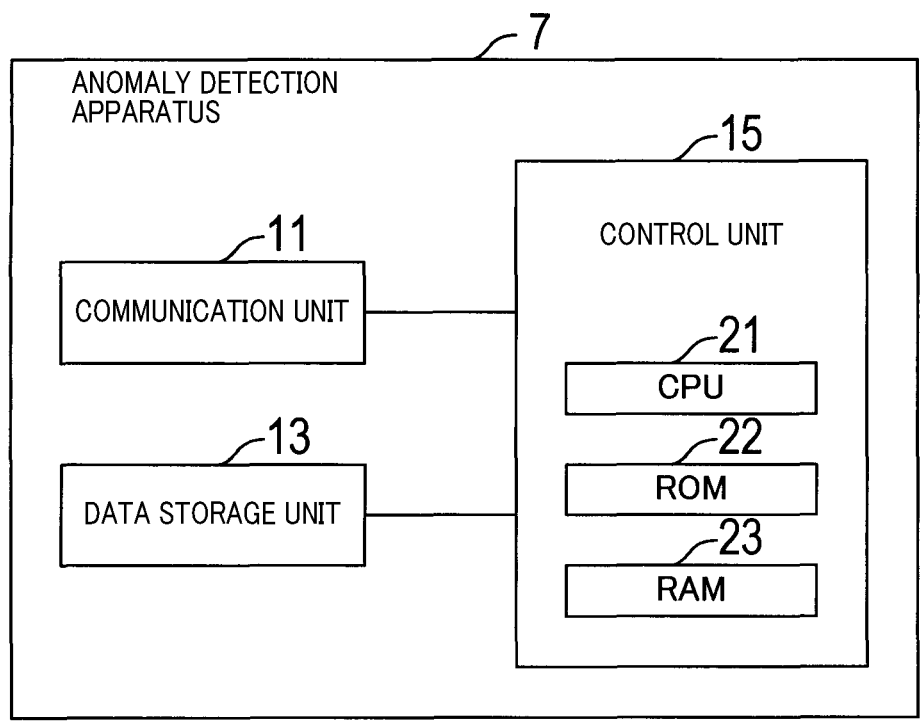
FIG. 2 is a block diagram showing the configuration of an anomaly detection apparatus.

As shown in FIG. 2, the anomaly detection apparatus 7 includes a communication unit 11, a data storage unit 13, and a control unit 15.

The communication unit 11 performs data communication with the roadside units 3 via the wired network NW. The roadside unit 3 transmits at least in-vehicle unit position information representing the position of the in-vehicle unit 5, identification information for identifying the in-vehicle unit 5, transmission time information representing the time when data is transmitted, driving data described later, behavior data described later, and image data described later to the anomaly detection apparatus 7. The in-vehicle unit position information indicates a position detected based on, for example, a GPS (global positioning system) signal received via a GPS antenna of a vehicle installing the automobile.

The data storage unit 13 is a unit for storing various data and is, for example, a hard disk drive.

The control unit 15 is an electronic control unit mainly configured by a known microcomputer including a CPU 21, a ROM 22, and a RAM 23. Various functions of the microcomputer are activated by the CPU 21 that executes a program stored in a non-transition entities recording medium (non-transitory computer-readable storage medium). In the embodiment, the ROM 22 corresponds to the non-transition entities recording medium storing the program. When the program is executed, the method corresponding to the program is performed. It is noted that number of microcomputers configuring the control unit 15 may be one or more.

Figure 3:
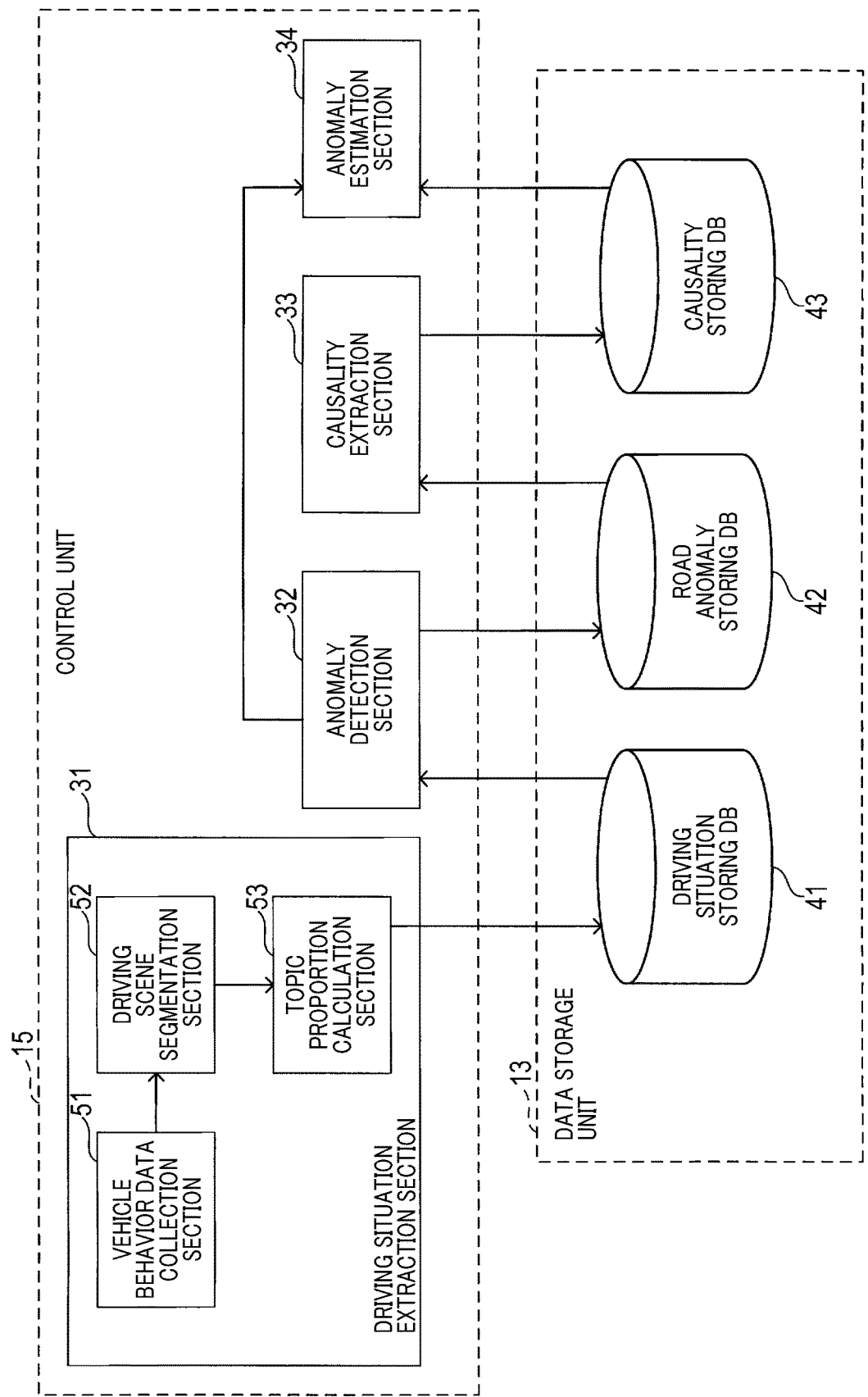
FIG. 3 is a functional block diagram schematically showing a process executed by a control unit.

As shown in FIG. 3, the control unit 15 includes a driving situation extraction section 31, an anomaly detection section 32, a causality extraction section 33, and an anomaly estimation section 34 as components for functions activated by the execution of the program by the CPU 21. These components configuring the control unit 15 may not be implemented only by software. Some of or all of the components may be implemented by one or more pieces of hardware. For example, if the above functions are implemented by electronic circuits, which are hardware, the electronic circuits may be structured by digital circuits including a number of logic circuits, analog circuits, or combinations thereof.

The data storage unit 13 includes a driving situation storing database 41, a road anomaly storing database 42, and a causality storing database 43. The data storage unit 13 stores road map data. In the road map data, a road is defied by nodes and links connecting the nodes. The data of the node includes a node ID, which is an identification number of the node, coordinates of the node, and the node type (e.g. intersection, meeting point, and the like). The data of the link includes a link ID, which is an identification number of the link, a link length, node IDs of nodes connected to the starting point and the end point, and the road type (e.g. expressway, tollway, general road, and the like).

Figure 4:
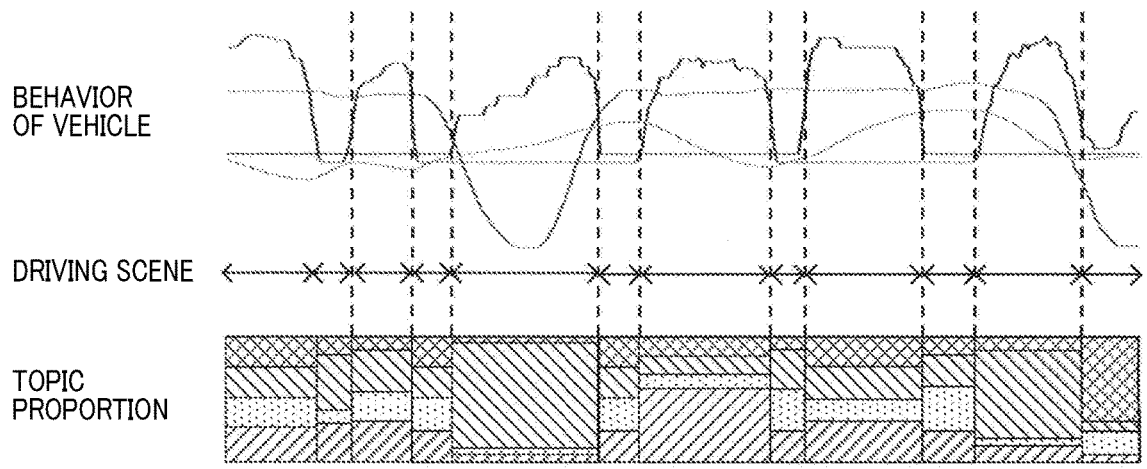
FIG. 4 is a diagram illustrating vehicle behavior data, a driving scene, and a topic proportion.

As shown in FIG. 4, the driving situation extraction section 31 segments data indicating behavior of the vehicle in time series, and defines each of the segmented data as a driving scene. In addition, the driving situation extraction section 31 uses, for example, a topic model disclosed in JP-A-2014-235605 to calculate a topic proportion for each of the driving scenes.

As shown in FIG. 3, the driving situation extraction section 31 includes a vehicle behavior data collection section 51, a driving scene segmentation section 52, and a topic proportion calculation section 53.

The vehicle behavior data collection section 51 repeatedly collects the in-vehicle unit position information, the driving data, the behavior data, and the image data from the plurality of in-vehicle units 5 via the roadside units 3. The driving data concerns driving operation of the driver of the vehicle in which the in-vehicle unit 5 is installed. The behavior data concerns behavior of the vehicle resulting from the driving operation of the driver of the vehicle in which the in-vehicle unit 5 is installed. The image data are data of images captured by a front camera attached to the vehicle so as to continuously image scenes, which can be seen by the driver through the windshield, ahead of the vehicle.

The vehicle behavior data collection section 51 generates differential data obtained by differentiating the driving data and the behavior data to generate multidimensional data including the driving data, the behavior data, and the differential data as vehicle behavior data. The driving data may be, for example, an operation amount of the accelerator pedal, an operation amount of the brake pedal, an operation amount of the steering wheel, operating conditions of the direction indicators, and a shift position of the transmission. The behavior data may be, for example, a speed or a yaw rate of the vehicle.

The driving scene segmentation section 52 statistically analyzes the vehicle behavior data by using a model representing a situation from environment cognition to operation of the driver to extract a switching point of the driving scene which the driver perceives. Thereby, the time series of the vehicle behavior data is segmented into a plurality of partial series, each of which represents any driving scene.

Figure 5:
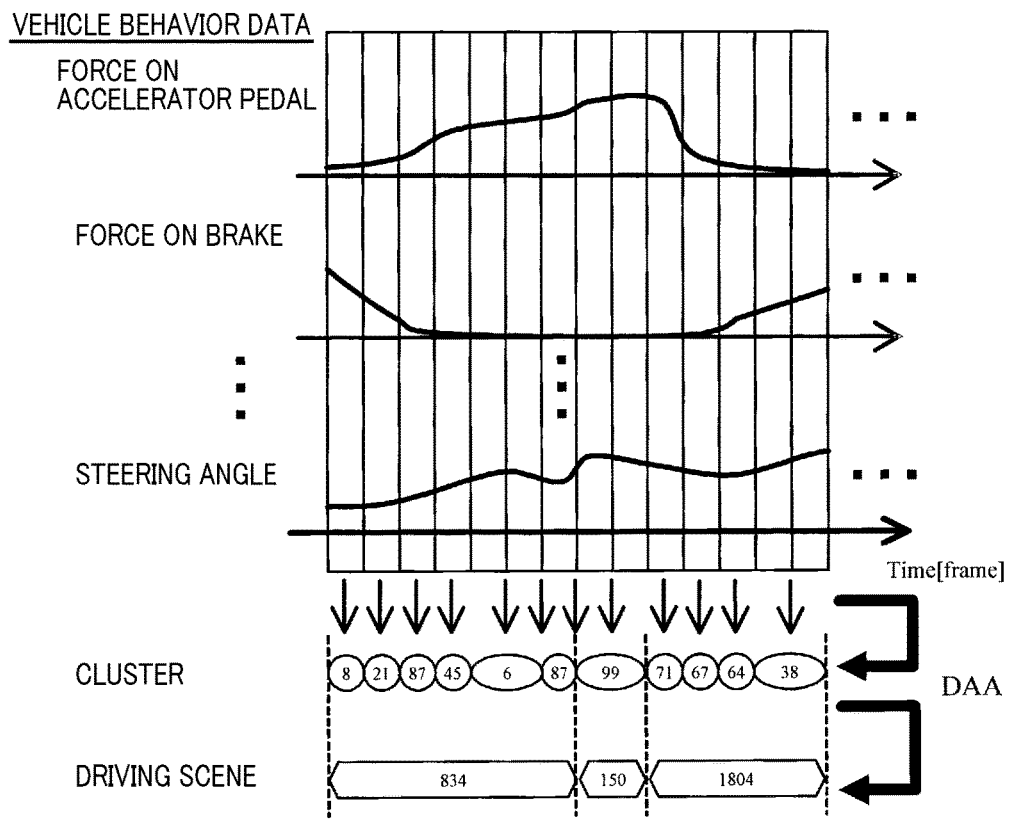
FIG. 5 is a diagram illustrating a process of dividing the driving scene.

Specifically, a double articulation analyzer is used which performs segmentation by an unsupervised driving scene segmentation method using a double articulation structure. As shown in FIG. 5, the double articulation analyzer previously defines a cluster representing various conditions of the vehicle obtained from the vehicle behavior data in a multi-dimensional space representing the range of the vehicle behavior data, and a transition probability (transfer probability) between the clusters. Then, the double articulation analyzer uses the defined information to statistically determine the cluster to which the generated vehicle behavior data belongs, thereby dividing the time series of the vehicle behavior data for every condition of the vehicle serving as a unit of division (i.e. for every cluster). In this regard, each cluster is previously associated with a sign for identification to convert the time series of the vehicle behavior data into a symbol string representing the cluster to which the vehicle behavior data belongs. For the generation of the symbol string, for example, a hierarchical Dirichlet process hidden Markov model (hereinafter, referred to as HDP-HMM) can be used which is one of models expressed by hidden states and probabilistic transition (probabilistic transfer) between the states.

Next, the double articulation analyzer segments the generated symbol string into partial series denoting predetermined driving scenes by using a nested Pitman-Yor language model (hereinafter, referred to as NPYLM), which is one example of an unsupervised chunking method for a discrete character string using statistical information. In this case, the dictionary size (i.e. the number of partial series) is made as small as possible, and the generation probability of the whole symbol string in which partial series are arranged is made maximum. Hence, the vehicle behavior data can be segmented into driving scenes. In this regard, the transition probability (transfer probability) between partial series and the generation probability of the partial series are used which are previously generated by learning.

It is noted that since a double articulation analyzer to which the HDP-HMM and the NPYLM is described in detail in, for example, non patent literatures, T. Taniguchi et al, "Semiotic Prediction of Driving Behavior using Unsupervised Double Articulation Analyzer" IEEE Intelligent Vehicles Symposium, 2012 and K. Takenaka et al, "Contextual Scene Segmentation of Driving Behavior based on Double Articulation Analyzer" IEEE/RSJ International Conference on Intelligent Robots and Systems, 2012, the descriptions thereof are omitted herein. However, the methods for generating a sign and segmenting the sign are not limited to the HDP-HMM and the NPYLM, and may be other than them.

For every driving scene generated by the driving scene segmentation section 52, the topic proportion calculation section 53 generates a vehicle behavior histogram corresponding to a feature amount distribution by using the vehicle behavior data belonging to the partial series corresponding to the driving scene.

Then, the topic proportion calculation section 53 calculates a topic proportion obtained by expressing the generated vehicle behavior histogram by the weighted sum of a plurality of prepared characteristic distributions (i.e. driving topics) and stores the calculated topic proportion in the driving situation storing database 41.

Figure 6:
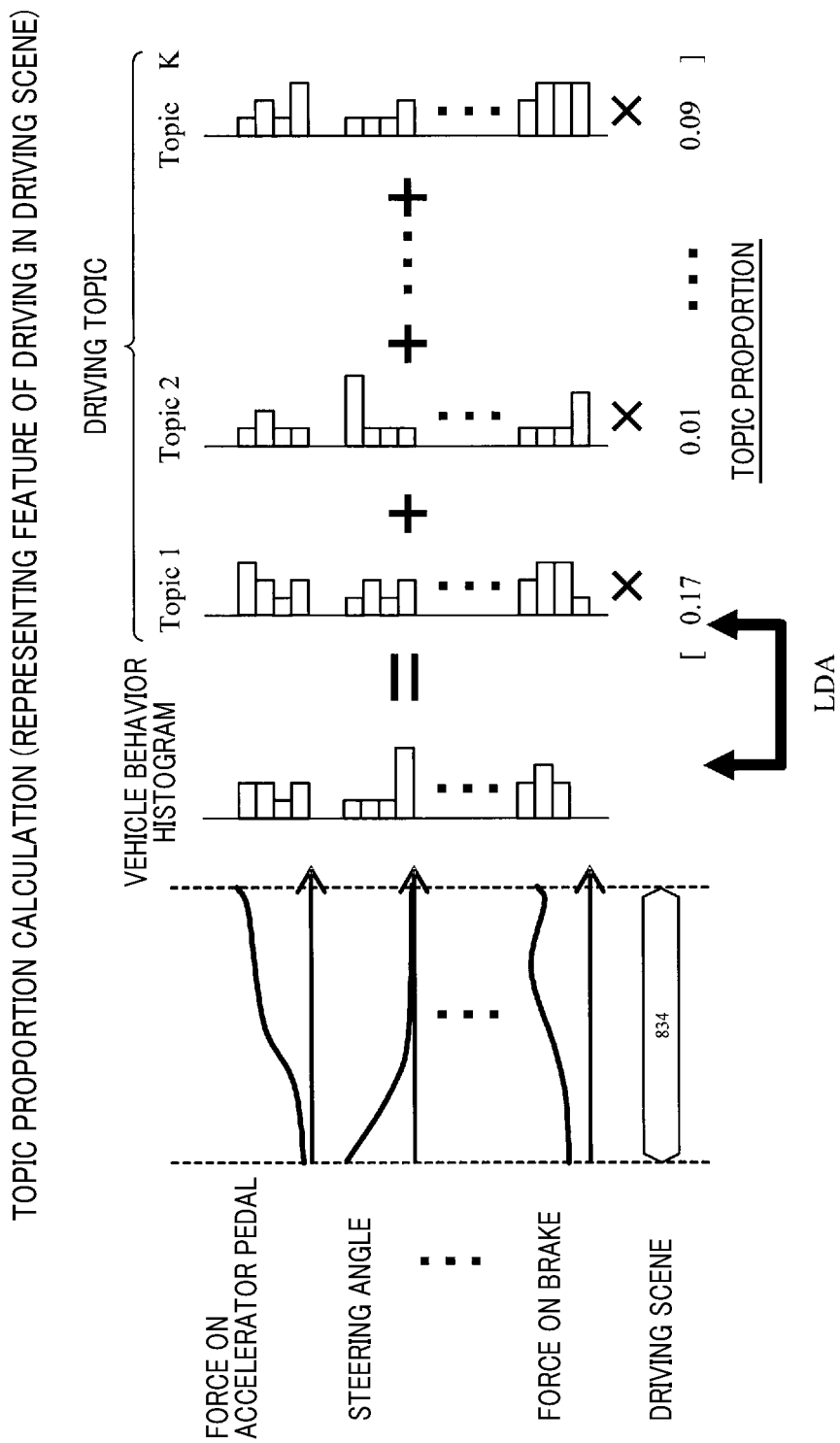
FIG. 6 is a diagram illustrating a process of calculating the topic proportion.

The vehicle behavior histogram expresses the feature amount of the vehicle behavior data, which belongs to partial series corresponding to the driving scene that is focused on, as a distribution. For example, if the feature amount is multidimensional data including, for example, an operation amount of the accelerator pedal, an operation amount of the brake pedal, an operation amount of the steering wheel, a vehicle speed, and respective differential data thereof, a histogram is generated which expresses a frequency of appearance of data, for every index that is obtained by dividing a feature space representing the range of the multidimensional data. It is noted that, as shown in FIG. 6, histograms may be generated for individual data, and the generated histograms may be connected. The connected histograms may be referred to as a vehicle behavior histogram.

The driving topic includes K (e.g. 100) base feature distributions Topic 1 to Topic K, which are used when the generated vehicle behavior histogram is expressed by the combination of a plurality of distributions (i.e. histograms).

The topic proportion is a combination ratio determined assuming that a vehicle behavior histogram is expressed by combing the base feature distributions and represents a content ratio of each driving topic to the vehicle behavior histogram.

The topic proportion is generated by using a topic estimation method used in the natural language processing field, assuming each of the partial series, each of which corresponds to any of the driving scenes, as one document, and assuming the observed feature amount distribution (herein, vehicle behavior histogram) as one word. Herein, latent Dirichlet allocation (hereinafter, referred to as LDA) is used. If a vehicle behavior histogram to be processed is formed of a plurality of types of histograms, multimodal LDA is used which is extended LDA. Specifically, an approximate method achieving LDA (or multimodal LDA), for example, variational Bayes and Gibbs sampling, which execute E step and M step, is used to execute only the E step.

Since the details of the above methods are described in, for example, D. Blei et al, "Latent Dirichlet Allocation" Journal of Machine Learning Research, 2003 and T. Griffiths & M. Steyvers, "Finding Scientific Topics," Proceedings of the National Academy of Sciences, 2004, descriptions of the methods are omitted herein. In addition, since the method of generating a base feature distribution is known and is described in, for example, JP-A-2014-235605, the description of the method is omitted herein.

Figure 7:
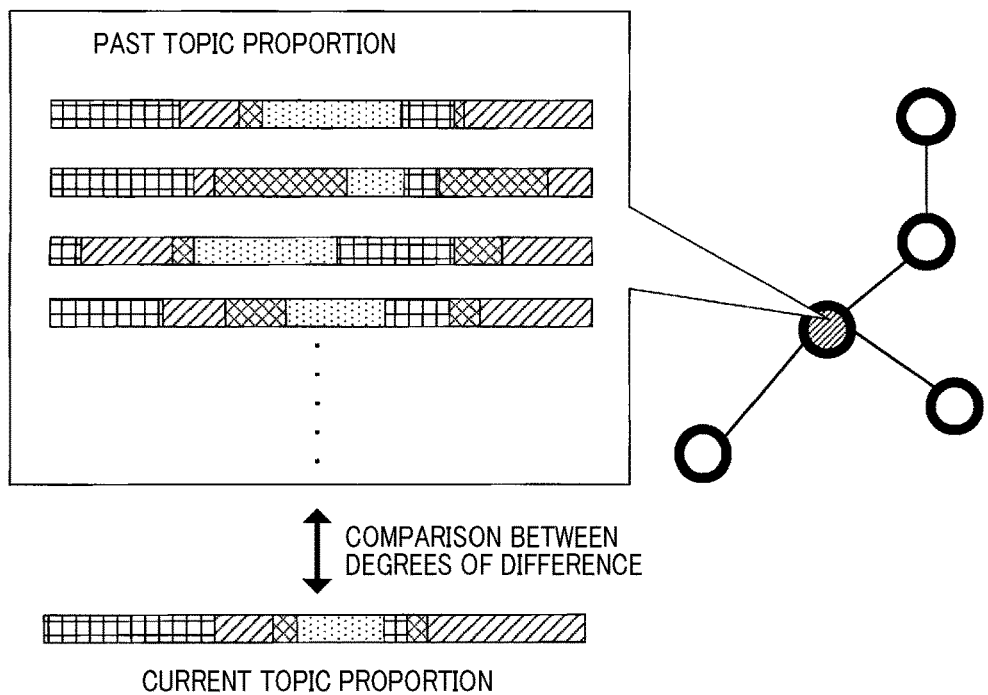
FIG. 7 is a diagram illustrating comparisons between a current topic proportion and past topic proportions.

As shown in FIG. 7, the anomaly detection section 32 extracts topic proportions from the driving situation storing database 41, and calculates the degree of difference between the current topic proportion and the past topic proportion in the same node as that of the current topic proportion. It is noted that, as described later, a topic proportion is associated with a node ID of the corresponding node based on the in-vehicle unit position information. Hence, the anomaly detection section 32 extracts the topic proportion, with which the same node ID as that of the current topic proportion is associated, as a past topic proportion in the same node as that of the current topic proportion.

Figure 8:
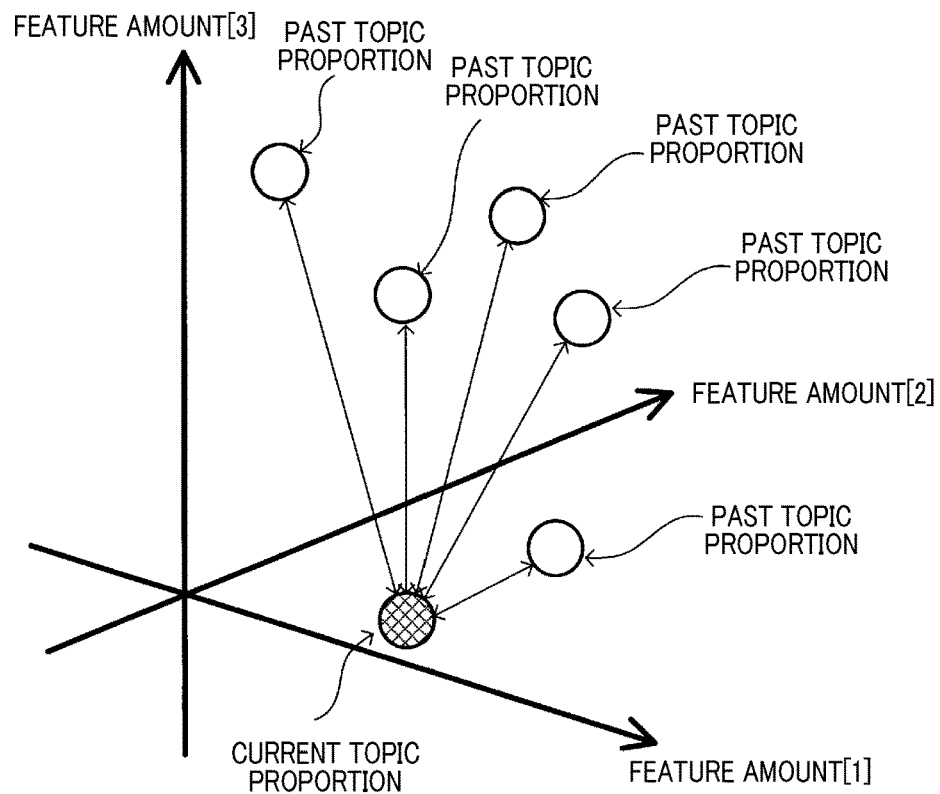
FIG. 8 is a diagram illustrating a method of calculating a degree of difference.

Specifically, as shown in FIG. 8, the anomaly detection section 32 first calculates a distance (e.g. Euclidean distance) between the current topic proportion and the past topic proportion by using the topic proportion as a feature amount. Then, the anomaly detection section 32 calculates an average value of the calculated one or more distances, and defines the average value as a degree of difference. Furthermore, if the calculated degree of difference is more than a predetermined first anomaly occurrence determination value, the anomaly detection section 32 determines that an anomaly has occurred in the same node as that of the current topic proportion. In addition, the anomaly detection section 32 applies an anomaly identification number to the anomaly. The anomaly identification number is for distinguishing the anomaly from other anomalies.

Then, until it is determined that the anomaly has disappeared, the anomaly detection section 32 generates accumulated data described later based on received data associated with a node for which it is determined that an anomaly has occurred therein (hereinafter, referred to as anomaly occurrence node) and received data associated with a node around the anomaly occurrence node. Whether or not received data is associated with an anomaly occurrence node and whether or not the received data is associated with a node around the anomaly occurrence node are determined based on a position indicated by the in-vehicle unit position information included in the received data. Specifically, the node closest to the position indicated by the in-vehicle unit position information among a plurality of nodes is associated with the received data including the in-vehicle unit position information.

Figure 9:
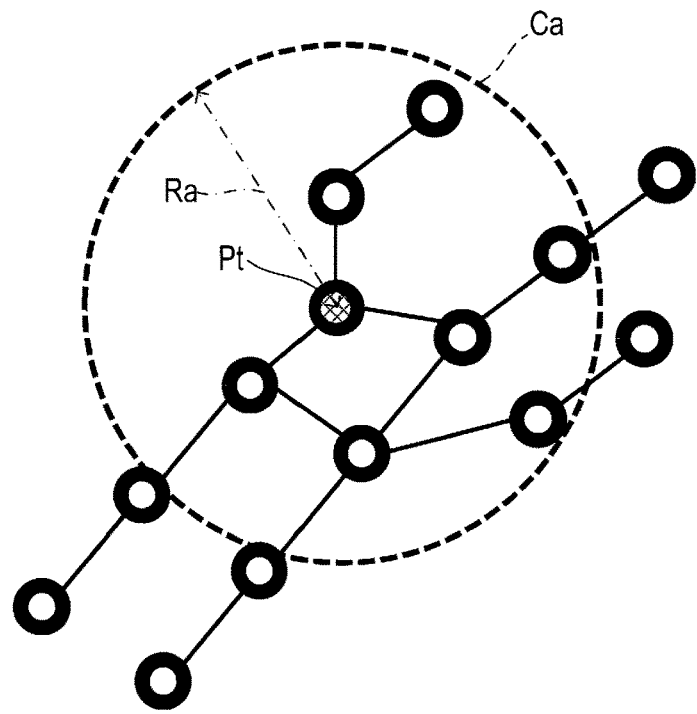
FIG. 9 is a diagram showing the periphery of an anomaly occurrence node.

The anomaly detection section 32 stores the generated accumulated data in the road anomaly storing database 42. The anomaly detection section 32 stores the accumulated data in a state where the accumulated data is associated with a corresponding node ID. As shown in FIG. 9, the anomaly detection section 32 determines that the inside of a periphery setting circle Ca having a predetermined periphery setting radius Ra and centering on an anomaly occurrence node Pt is the periphery of the anomaly occurrence node.

If the calculated degree of difference becomes the first anomaly occurrence determination value or less, the anomaly detection section 32 determines that the anomaly has disappeared. In addition, the anomaly detection section 32 applies the same anomaly identification number to the accumulated data accumulated from the time when it is determined that the anomaly has occurred (hereinafter, anomaly occurrence determination time) to the time when it is determined that the anomaly has disappeared (hereinafter, anomaly disappearance determination time).

Figure 10:
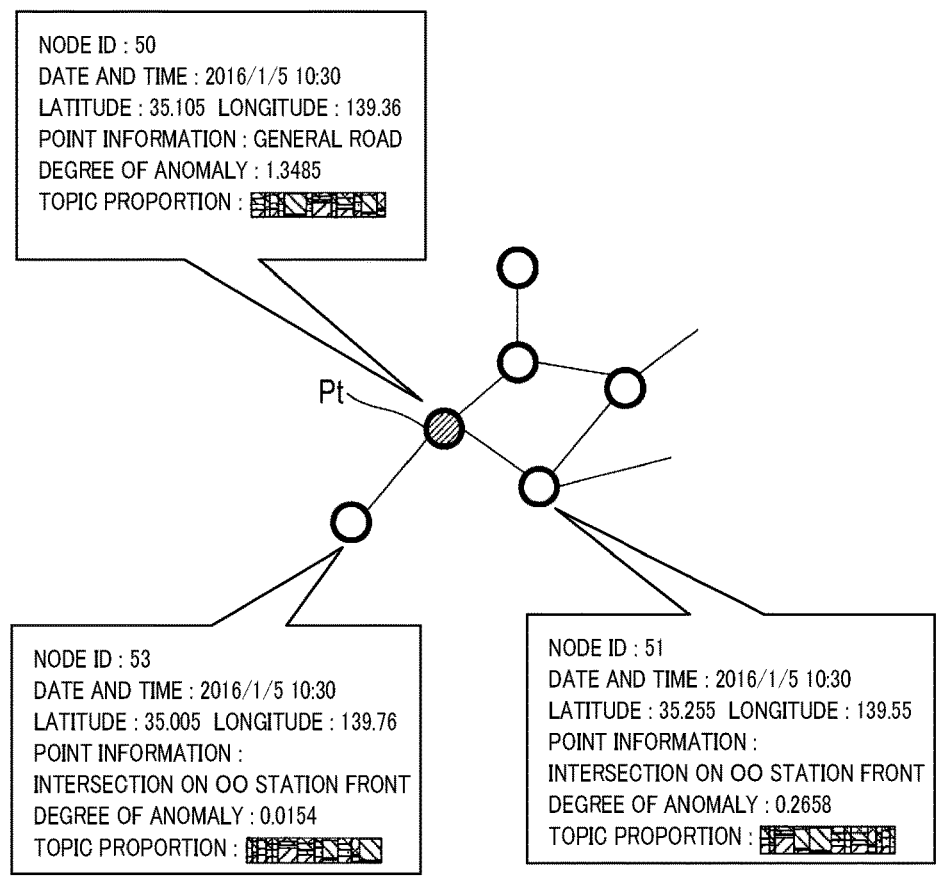
FIG. 10 is a diagram illustrating data stored in a road anomaly storing database.

As shown in FIG. 10, the accumulated data stored in the road anomaly storing database 42 by the anomaly detection section 32 includes a node ID, a date and time, latitude, longitude, information peculiar to the node (e.g. intersection, station front, and event venue front), a degree of anomaly, and a topic proportion. The degree of anomaly is, for example, an accumulation of degrees of difference of the plurality of last vehicles (e.g. five vehicles). It is noted that the accumulated data may be average data of a plurality of vehicles, typical data, or data of all the plurality of vehicles.

Figure 11:
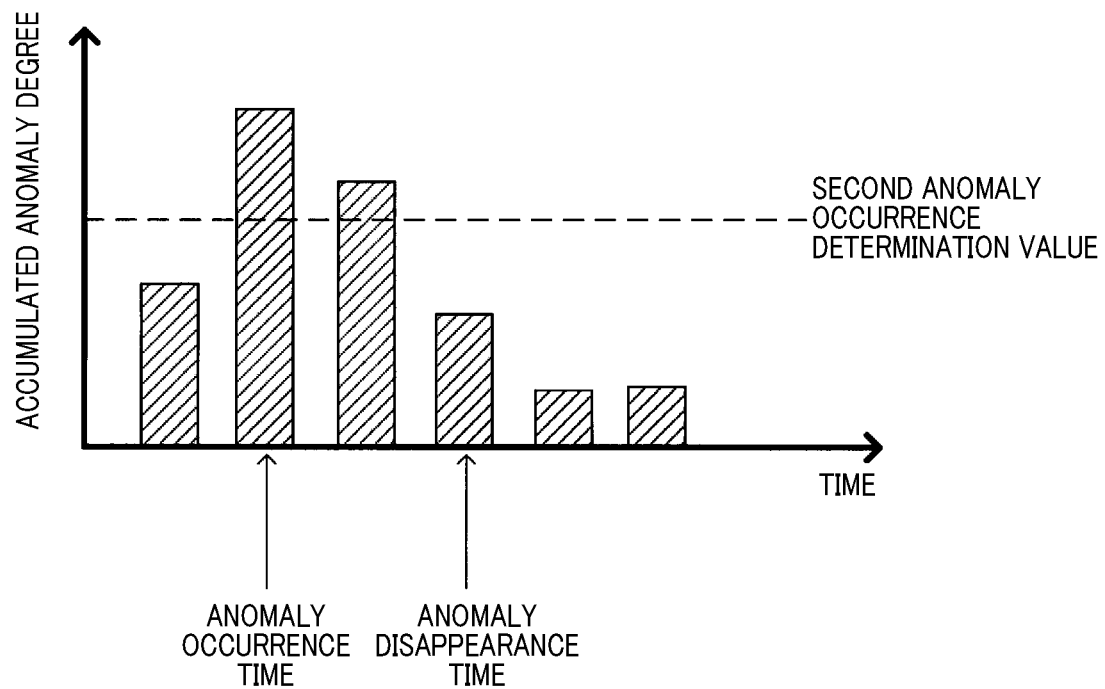
FIG. 11 is a diagram showing an accumulated anomaly degree histogram.

As shown in FIG. 11, the causality extraction section 33 calculates a degree of anomaly at every predetermined anomaly degree calculation period (e.g. 5 minutes) by using the data accumulated from the anomaly occurrence determination time to the anomaly disappearance determination time to generate an accumulated anomaly degree histogram, and stores the accumulated anomaly degree histogram in the road anomaly storing database 42. At anomaly degree calculation timing, an accumulated anomaly degree is calculated. The anomaly degree calculation timing arrives every time when the anomaly degree calculation period has passed, from the first anomaly degree calculation timing, which is the anomaly occurrence determination time. The accumulated anomaly degree is the sum of the degrees of difference calculated at one or more anomaly degree calculation timings by using driving data and behavior data, which are required for the calculation (e.g. five driving data and behavior data), transmitted from the roadside units 3 at the last (most recent) anomaly degree calculation timing. The accumulated anomaly degree histogram has a vertical axis indicating the accumulated anomaly degree and a horizontal axis indicating time. The causality extraction section 33 generates accumulated anomaly degree histograms for an anomaly occurrence node and one or more nodes around the anomaly occurrence node.

Then, the causality extraction section 33 determines anomaly occurrence time and anomaly disappearance time for each of the accumulated anomaly degree histograms generated for the plurality of nodes. At the anomaly occurrence time, the accumulated anomaly degree becomes a predetermined second anomaly occurrence determination value or more. At the anomaly disappearance time, the accumulated anomaly degree becomes less than the second anomaly occurrence determination value.

Figure 12:
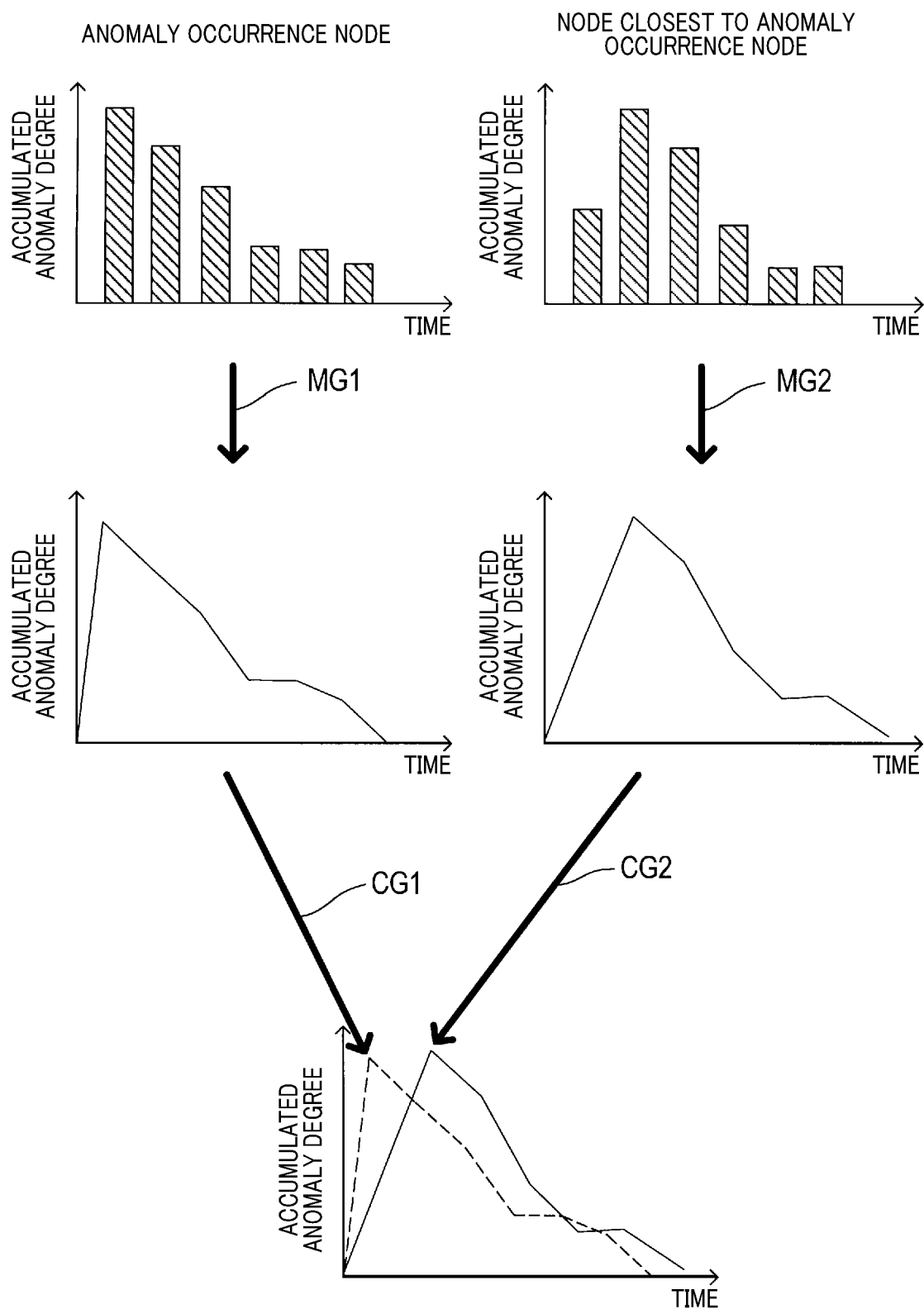
FIG. 12 is a diagram illustrating a comparison between anomaly transition graphs.

As shown in FIG. 12, the causality extraction section 33 generates anomaly transition (probability) graphs for the anomaly occurrence node and the node around the anomaly occurrence node by using the accumulated anomaly degree histograms. The anomaly transition graph is generated by plotting the heights of a plurality of bins forming the accumulated anomaly degree histogram and connecting the plotted points by straight lines. In FIG. 12, as indicated by an arrow MG1, an anomaly transition graph is generated from the accumulated anomaly degree histogram for the anomaly occurrence node, and as indicated by an arrow MG2, an anomaly transition graph is generated from the accumulated anomaly degree histogram for the node closest to the anomaly occurrence node.

Then, the causality extraction section 33 analyzes causality between variation in anomaly represented by the anomaly transition graph for the anomaly occurrence node and variation in anomaly represented by the anomaly transition graph for the node around the anomaly occurrence node, thereby evaluating the influence of the anomaly, which has occurred at the anomaly occurrence node, on the node around the anomaly occurrence node. In the present embodiment, the causality extraction section 33 uses, for example, a Granger causality model to analyze causality between the anomaly occurrence node and the respective plurality of nodes around the anomaly occurrence node. In FIG. 12, as indicated by an arrow CG1 and an arrow CG2, the anomaly transition graph for the anomaly occurrence node and the anomaly transition graph for the node closest to the anomaly occurrence node are compared with each other to analyze the causality.

Furthermore, the causality extraction section 33 uses the anomaly transition graph of the anomaly occurrence node and the anomaly transition graphs of the plurality of nodes around the anomaly occurrence node to generate temporal transition information (temporal transfer information) on the transition (transfer) of the anomaly with time.

Then, as a result of the analysis of the causality, if the causality extraction section 33 determines that causality is established between the anomaly occurrence node and the nodes around the anomaly occurrence node, the causality extraction section 33 stores the following causality information in the causality storing database 43.

The causality information includes anomaly node information, occurrence time information, disappearance time information, transition time information (transfer time information), anomaly degree information, and feature amount information.

The anomaly node information includes information for specifying the position of the anomaly occurrence node and information for specifying the position of the node to which transition of anomaly is made (to which anomaly is transferred) (hereinafter, referred to as anomaly transition (transfer) node).

The occurrence time information includes information representing the time when anomaly has occurred at the anomaly occurrence node and information representing the time when anomaly has occurred at the anomaly transition node.

The transition time information includes information representing the time period required for the transition of the anomaly from the anomaly occurrence node to the anomaly transition node.

The anomaly degree information includes information representing the degree of anomaly at the anomaly occurrence node and the degree of anomaly at the anomaly transition node.

The feature amount information includes information representing the feature amount (topic proportions in the present embodiment) used for calculating the degree of anomaly at the anomaly occurrence node and information representing the feature amount used for calculating the degree of anomaly at the anomaly transition node.

As a result of the analysis of the causality, the causality information of the anomaly determined to have causality with the anomaly, which has occurred at the anomaly occurrence node, is stored in the causality storing database 43 in the state where the same anomaly identification number as that stored in the road anomaly storing database 42 is applied to the causality information.

Figure 13:
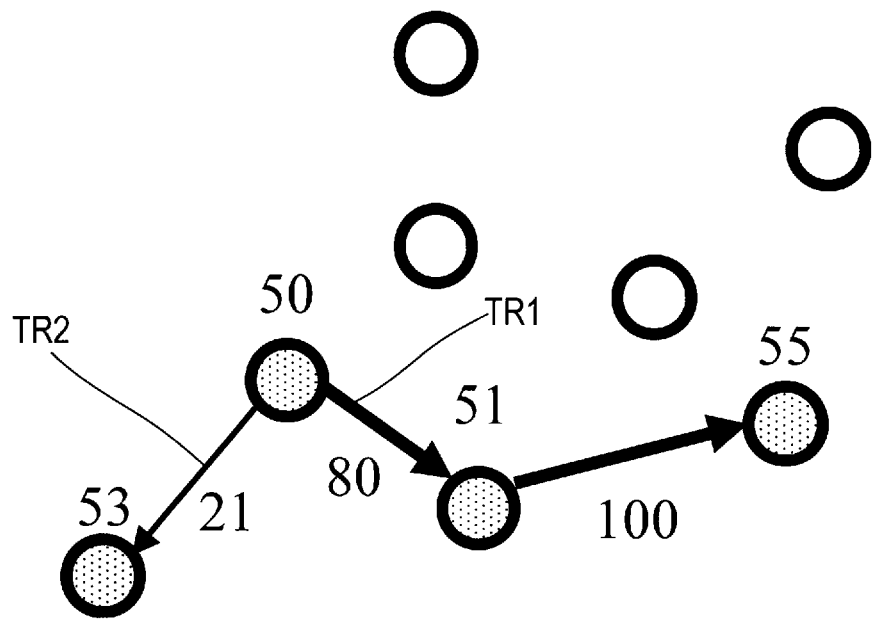
FIG. 13 is a diagram showing an anomaly transition map.

When the anomaly detection section 32 detects an anomaly, the anomaly estimation section 34 extracts information representing the anomaly of the anomaly transition node having causality with the anomaly occurrence node corresponding to the anomaly detected by the anomaly detection section 32. Then, as shown in FIG. 13, the anomaly estimation section 34 uses the number of extracted anomalies having the causality to map the transition (transfer) of the anomaly. FIG. 13 illustrates an anomaly transition map (anomaly transfer map) obtained when an anomaly has occurred at the node having a node ID of 50.

As shown in FIG. 13, nodes having respective node IDs of 51, 53, and 55 are disposed in the vicinity of the node having a node ID of 50. An arrow TR1, whose starting point is the node having a node ID of 50 and whose end point is the node having a node ID of 51, indicates a transition (transfer) of anomaly from the node having a node ID of 50. The numeral 80 written in the vicinity of the arrow TR1 indicates the number of anomalies extracted at the node having a node ID of 51 and having causality with the anomaly, which has occurred at the node having a node ID of 50.

Similarly, an arrow TR2 indicates a transition of anomaly from the node having a node ID of 50 to the node having a node ID of 53. The numeral 21 written in the vicinity of the arrow TR2 indicates the number of anomalies extracted at the node having a node ID of 53 and having causality with the anomaly that has occurred at the node having a node ID of 50.

In addition, the anomaly estimation section 34 generates an anomaly transition map such that as the number of extracted anomalies increases, the corresponding arrow becomes thicker. In FIG. 13, the arrow TR1 is thicker than the arrow TR2. When two nodes are not connected via an arrow, there is no transition (transfer) of anomaly between the two nodes.

Next, the procedure of a driving situation extraction process executed by the control unit 15 will be described. The driving situation extraction process corresponds to the driving situation extraction section 31 and is repeatedly executed while the control unit 15 is operating.

Figure 14:
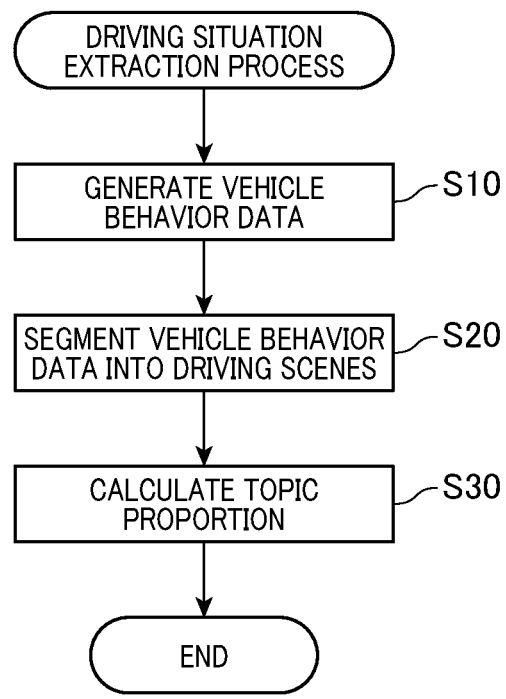
FIG. 14 is a flowchart of a driving situation extraction process.

When the driving situation extraction process starts, as shown in FIG. 14, first in S10, the CPU 21 of the control unit 15 generates vehicle behavior data by using driving data and behavior data received by the communication unit 11 from the roadside unit 3. The step of S10 corresponds to the vehicle behavior data collection section 51.

In S20, the CPU 21 statistically analyzes the vehicle behavior data and segments time series of the vehicle behavior data into a plurality of driving scenes. The step of S20 corresponds to the driving scene segmentation section 52. In S30, the CPU 21 calculates a topic proportion for each of the driving scenes, and stores the calculated topic proportions in the driving situation storing database 41 in a state where the topic proportions are associated with node IDs of nodes corresponding to the received in-vehicle unit position information. Then, the CPU 21 halts the driving situation extraction process. The node corresponding to in-vehicle unit position information is closest to the position indicated by the in-vehicle unit position information. One node is associated with one piece of in-vehicle unit position information. The step of S30 corresponds to the topic proportion calculation section 53.

Next, the procedure of an anomaly detection process executed by the control unit 15 will be described. The anomaly detection process corresponds to the anomaly detection section 32 and is repeatedly executed while the control unit 15 is operating.

Figure 15:
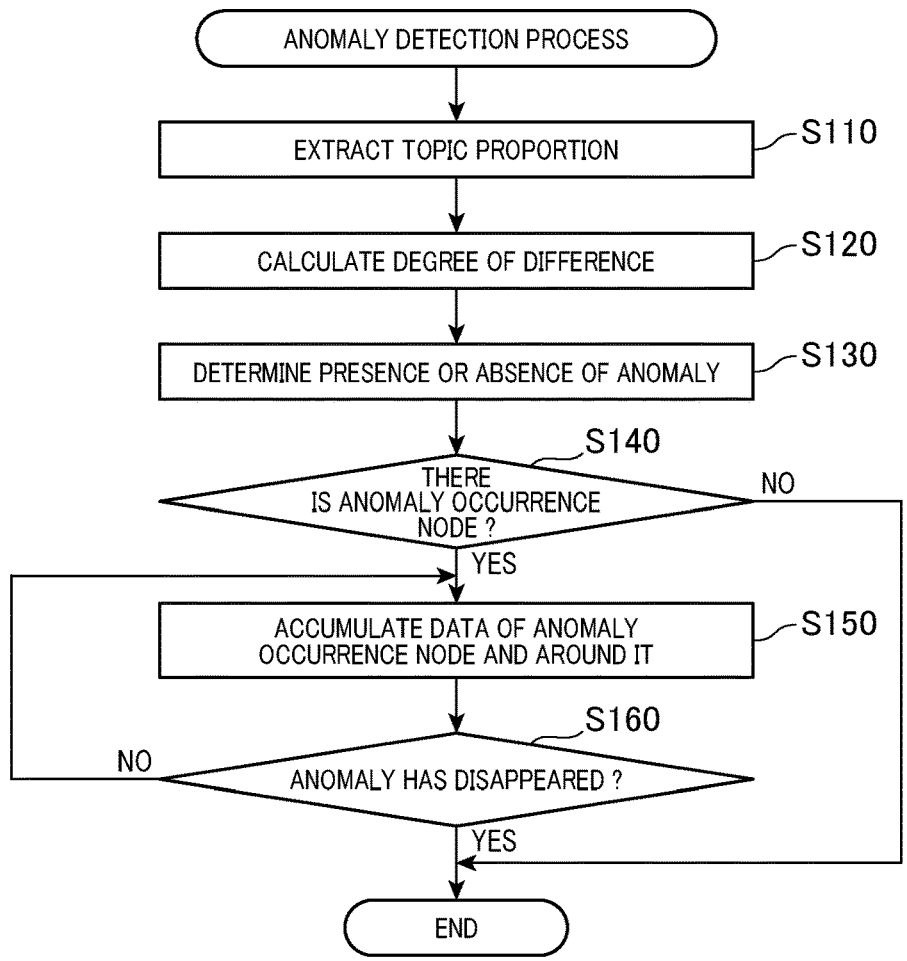
FIG. 15 is a flowchart of an anomaly detection process.

When the anomaly detection process starts, as shown in FIG. 15, first in S110, the CPU 21 of the control unit 15 extracts the latest topic proportion, which has not been used for detecting anomaly, among the topic proportions stored in the driving situation storing database 41.

In S120, concerning the latest topic proportion extracted in S110, the CPU 21 calculates the degree of difference between the extracted topic proportion and the past topic proportion at the same node.

In S130, the CPU 21 determines presence or absence of an anomaly. Specifically, concerning each of all the calculated degrees of difference, the CPU 21 determines whether the calculated degree of difference is more than the predetermined first anomaly occurrence determination value. If the degree of difference is more than the first anomaly occurrence determination value, the CPU 21 determines that an anomaly has occurred at the node corresponding to the degree of difference. In contrast, if the degree of difference is not more than the first anomaly occurrence determination value, the CPU 21 determines that no anomaly has occurred at the node corresponding to the degree of difference.

In S140, the CPU 21 determines whether there is a node at which an anomaly has occurred (hereinafter, referred to as anomaly occurrence node) based on the result of the determination in S130. If there is no anomaly occurrence node, the CPU 21 halts the anomaly detection process. In contrast, if there is an anomaly occurrence node, in S150, the CPU 21 generates the accumulated data based on received data associated with the anomaly occurrence node and received data associated with a node around the anomaly occurrence node, and stores the generated accumulated data in the road anomaly storing database 42. Since the details of the accumulated data have been described, the description thereof is omitted here.

In S160, the CPU 21 determines whether or not the anomaly has disappeared at the anomaly occurrence node. Specifically, first, the CPU 21 extracts the latest topic proportion, which has not been used for detecting anomaly at the anomaly occurrence node, among the topic proportions stored in the driving situation storing database 41. In addition, concerning the extracted topic proportion, the CPU 21 calculates the degree of difference, and determines whether the calculated degree of difference is more than the first anomaly occurrence determination value. If the degree of difference is more than the first anomaly occurrence determination value, the CPU 21 determines that the anomaly continues at the anomaly occurrence node. In contrast, if the degree of difference is not more than the first anomaly occurrence determination value, the CPU 21 determines that the anomaly has disappeared at the anomaly occurrence node.

In S160, if it is determined that the anomaly has not disappeared at the anomaly occurrence node, the process proceeds to S150. In contrast, it is determined that the anomaly has disappeared at the anomaly occurrence node, the CPU 21 halts the anomaly detection process.

Next, the procedure of a causality extraction process executed by the control unit 15 will be described. The causality extraction process corresponds to the causality extraction section 33 and is repeatedly executed while the control unit 15 is operating.

Figure 16:
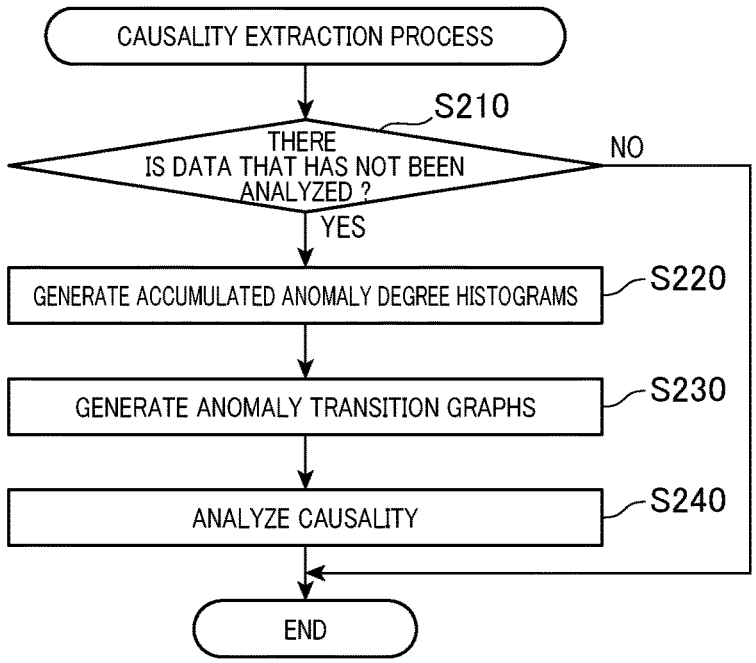
FIG. 16 is a flowchart of a causality extraction process according to a first embodiment.

When the causality extraction process starts, as shown in FIG. 16, first in S210, the CPU 21 of the control unit 15 determines whether there is latest data that has not been used for analyzing causality, among the data stored in the road anomaly storing database 42. If there is no latest data that has not been used for analyzing causality, the CPU 21 halts the causality extraction process.

In contrast, if there is latest data that has not been used for analyzing causality, in S210, the CPU 21 first extracts data, to which the same anomaly identification number is applied, from the road anomaly storing database 42. Then, the CPU 21 uses the extracted data to generate respective accumulated anomaly degree histograms concerning the anomaly occurrence node and the nodes around the anomaly occurrence node.

In S230, the CPU 21 generates anomaly transition (transfer) graphs corresponding to respective accumulated anomaly degree histograms generated in S220. In S240, the CPU 21 uses the anomaly transition graphs generated in S230 to analyze causality between the anomaly occurrence node and the nodes around the anomaly occurrence node. If it is determined that there is causality between the anomaly occurrence node and the nodes around the anomaly occurrence node, the CPU 21 stores the causality information described above in the causality storing database 43 and halts the causality extraction process.

Next, the procedure of an anomaly estimation process executed by the control unit 15 will be described. The anomaly estimation process corresponds to the anomaly estimation section 34 and is repeatedly executed while the control unit 15 is operating.

Figure 17:
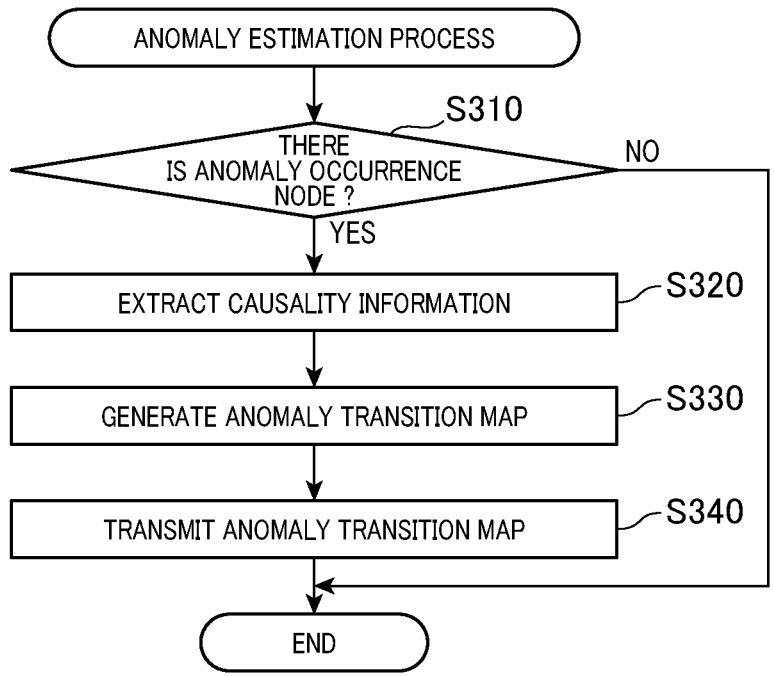
FIG. 17 is a flowchart of an anomaly estimation process according to the first embodiment.

When the anomaly estimation process starts, as shown in FIG. 17, first in S310, the CPU 21 of the control unit 15 determines whether there is an anomaly occurrence node based on the result of the determination in S140 of the anomaly detection process. If there is no is anomaly occurrence node, the CPU 21 halts the anomaly estimation process.

In contrast, if there is an anomaly occurrence node, in S320, the CPU 21 extracts causality information indicating an anomaly of the anomaly transition node having causality with the anomaly occurrence node from the causality storing database 43, and counts the number of extracted anomalies for respective anomaly transition nodes having the causality.

In S330, the CPU 21 uses the number of extracted anomalies having causality to generate an anomaly transition map by mapping the transition of the anomaly. In S340, the CPU 21 transmits the generated anomaly transition map to the roadside unit 3 disposed in the vicinity of the anomaly occurrence node and the roadside unit 3 disposed in the vicinity of the node around the anomaly occurrence node, then halts the anomaly estimation process.

Figure 18:
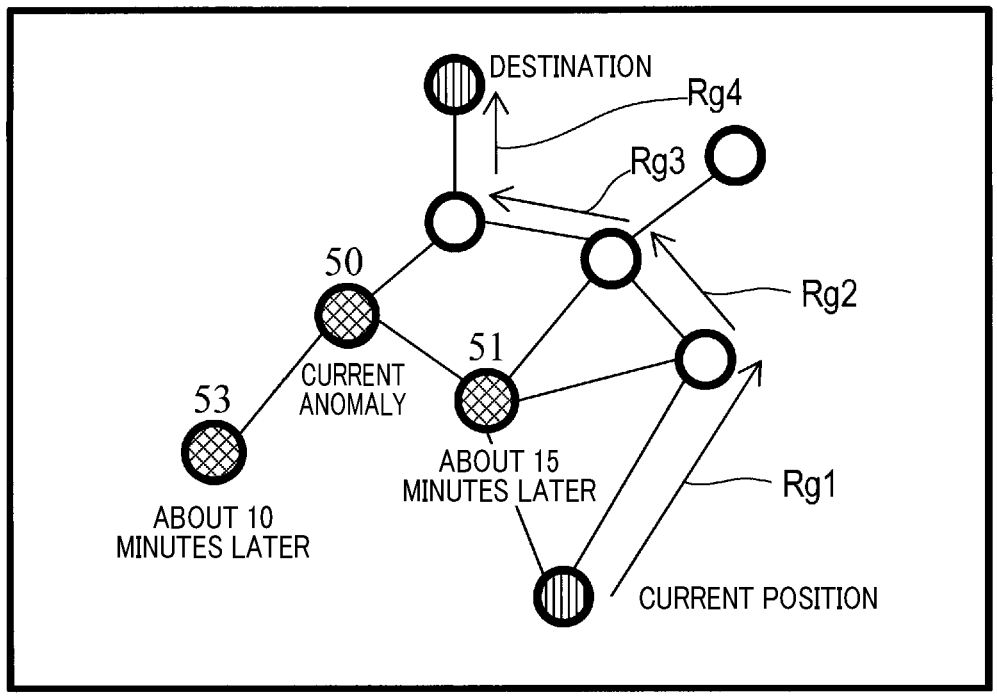
FIG. 18 is a diagram illustrating route guidance avoiding an anomaly occurrence node.

Then, the roadside unit 3 that has received the anomaly transition map transmits the received anomaly transition map to the in-vehicle unit 5 installed in a vehicle running in the vicinity of the roadside unit 3. Hence, in the vehicle in which the in-vehicle unit 5 that has received the anomaly transition map is installed, as shown in FIG. 18, a navigation system installed in the vehicle can guide a route avoiding the anomaly occurrence node. In FIG. 18, an anomaly has occurred at present in the vicinity of the node having a node ID of 50, transition of the anomaly is made in the vicinity of the node having a node ID of 51 about 15 minutes later, and transition of the anomaly is made in the vicinity of the node having a node ID of 53 about 10 minutes later. In addition, in FIG. 18, guiding routes Rg1, Rg2, Rg3, and Rg4 from the current position to the destination are set so as to avoid vicinities of nodes having node Ids of 50, 51, and 53.

The anomaly detection apparatus 7 configured as described above includes the driving situation extraction section 31, the anomaly detection section 32, the causality extraction section 33, and the anomaly estimation section 34.

The vehicle behavior data collection section 51 of the driving situation extraction section 31 repeatedly collects the driving data, the behavior data, and the image data for a plurality of vehicles.

The driving scene segmentation section 52 and the topic proportion calculation section 53 of the driving situation extraction section 31 calculates a topic proportion from the collected driving data and behavior data, associates the topic proportion with the node corresponding to the topic proportion, and stores them.

The anomaly detection section 32 determines whether there is an anomaly occurrence node, at which an anomaly has occurred, at the present time based on the degree of difference calculated by using the calculated topic proportion. Since the topic proportion is associated with a node ID, the anomaly detection section 32 compares the topic proportion calculated at the present time with the topic proportion calculated in the past for the same node as that of the topic proportion calculated at the present time, to determine whether there is an anomaly occurrence node at the present time.

When determining that there is an anomaly occurrence node at the present time, the anomaly detection section 32 uses the received data associated with the anomaly occurrence node and the received data associated with the node around the anomaly occurrence node (hereinafter, referred to as anomaly peripheral node) to generate accumulated data, and stores the generated accumulated data.

The causality extraction section 33 uses the stored accumulated data to generate causality information representing causality between the anomaly caused at the anomaly occurrence node and the anomaly caused at the node around the anomaly occurrence node.

When the anomaly detection section 32 determines that there is an anomaly occurrence node at the present time, the anomaly estimation section 34 uses the past causality information generated by the causality extraction section 33 to estimate a transition of an anomaly from the anomaly occurrence node, whose presence at the present time is determined by the anomaly detection section 32, to the node around the anomaly occurrence node.

As described above, the anomaly detection apparatus 7 stores accumulated data generated by using the driving data and the behavior data of the anomaly occurrence node and the anomaly peripheral node to generate causality information by using the stored accumulated data. The causality information represents causality between the anomaly caused at the anomaly occurrence node and the anomaly caused at the anomaly peripheral node. Hence, if determining that there is an anomaly occurrence node at the present time, the anomaly detection apparatus 7 can estimate the node to which transition of the anomaly is made (i.e. as anomaly peripheral node) from the anomaly occurrence node by extracting the past causality information representing causality with the anomaly, which has occurred at the anomaly occurrence node. Thus, when an anomaly occurs, the anomaly detection apparatus 7 can, by accumulating causality information, quickly estimate a transition of the anomaly by a simple method and quickly specify the range of the influence of the anomaly, whereby an alternative route can be quickly calculated.

In addition, the anomaly detection section 32 determines that the node inside the periphery setting circle Ca previously set so as to include the anomaly occurrence node is a node around the anomaly occurrence node. That is, the anomaly detection apparatus 7 determines that transition of anomaly, which has occurred at the anomaly occurrence node, may be made to the node that is not directly connected to the anomaly occurrence node via a road, and estimates the transition of the anomaly. Thus, the anomaly detection apparatus 7 can estimate the transition of the anomaly regardless of the structure of the road.

In addition, the anomaly estimation section 34 extracts the past causality information of the anomaly transition node having causality with the anomaly occurrence node, and counts the number of extracted anomalies for respective anomaly transition nodes having causality. Hence, the anomaly detection apparatus 7 can estimate the transition of the anomaly so that the, possibility of the transition of the anomaly from the anomaly occurrence node to the anomaly transition node becomes high. In addition, since the degree of probability of the transition of the anomaly can be determined by a simple method in which the number of extracted anomalies is counted, the anomaly detection apparatus 7 can reduce the processing load of the estimation of the transition of the anomaly.

In the embodiment described, the anomaly detection apparatus 7 corresponds to an anomaly estimation apparatus, S10 corresponds to a process as a collection section, S20 and S30 correspond to a process as a feature amount calculation section, and S110 to S140 correspond to a process as an anomaly determination section.

In addition, S150 and S160 correspond to a process as an accumulation section, S210 to S240 correspond to a process as an information generation section, and S310 to S330 correspond to a process as an estimation section.

In addition, the driving data and the behavior data correspond to vehicle data, the anomaly occurrence node corresponds an anomaly occurrence point, the topic proportion corresponds to a feature amount, and the accumulated data corresponds to data for estimation (estimation data).

In addition, the current topic proportion corresponds to a current feature amount, the past topic proportion corresponds to a past feature amount, the periphery setting circle Ca corresponds to a periphery determination area, and the accumulated anomaly degree corresponds to an anomaly degree.

Second Embodiment

Hereinafter, the second embodiment will be described with reference to the drawings. In the second embodiment, parts different from those of the first embodiment will be described. The same reference numeral is added to a component common to the first embodiment.

An anomaly detection apparatus 1 of the second embodiment differs from that of the first embodiment in that the causality extraction process and the anomaly estimation process are modified.

Figure 19:
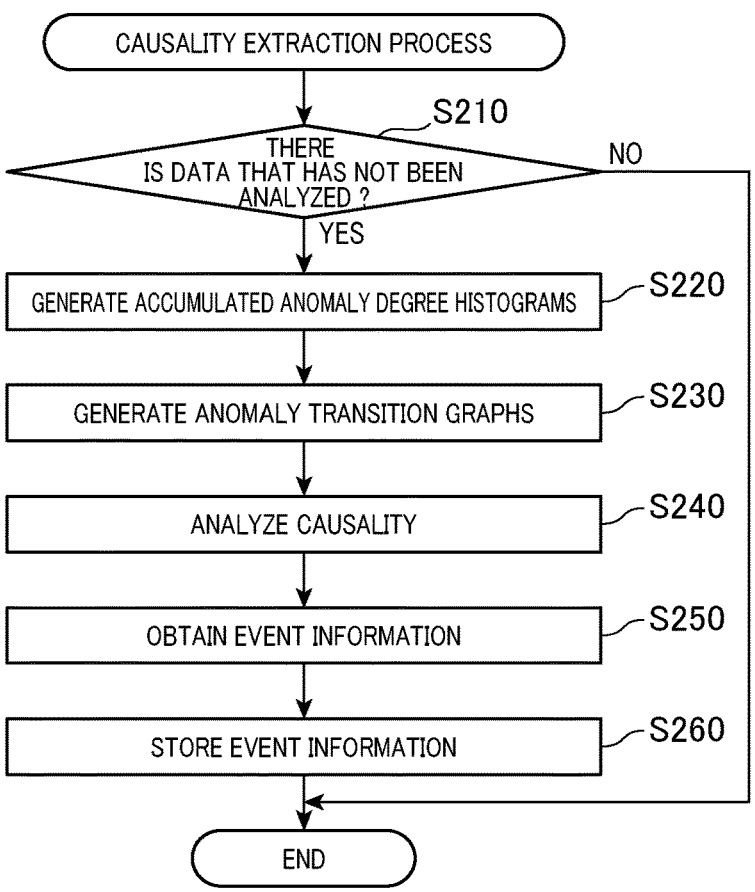
FIG. 19 is a flowchart of a causality extraction process according to a second embodiment.

As shown in FIG. 19, the causality extraction process of the second embodiment differs from that of the first embodiment in that steps of S250 and S260 are added.

That is, when the step of S240 ends, in S250, the CPU 21 obtains event information linked to an anomaly occurrence node, for which causality is analyzed in S240, and the date and time when the anomaly occurred. Then, in S260, the CPU 21 stores the event information obtained in S250 in the causality storing database 43 in a state where the event information is associated with the causality information stored in S240, and halts the causality extraction process.

Figure 20:
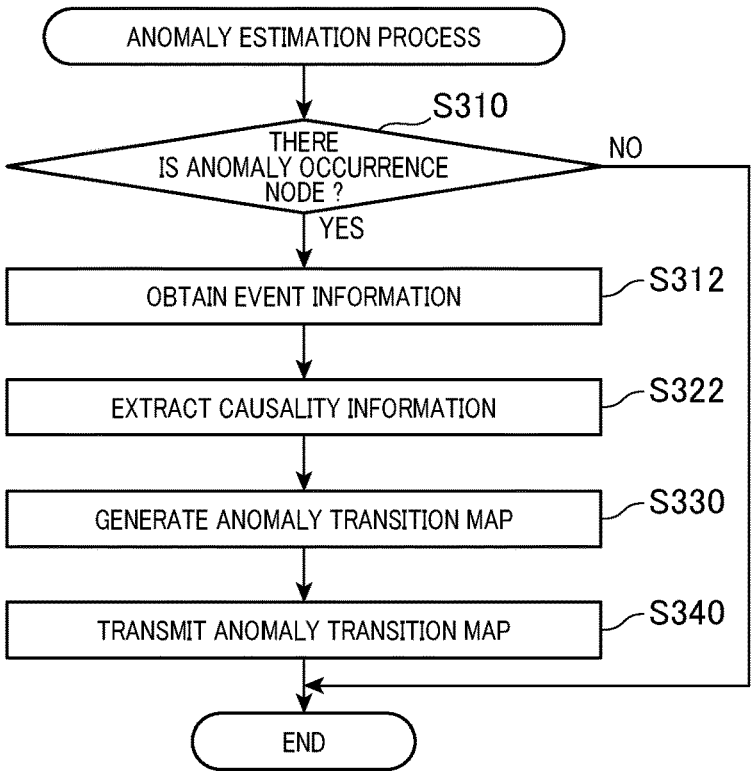
FIG. 20 is a flowchart of an anomaly estimation process according to the second embodiment.

As shown in FIG. 20, an anomaly estimation process of the second embodiment differs from that of the first embodiment in that the step of S320 is omitted, and steps of S312 and S322 are added.

That is, if there is an anomaly occurrence node in S310, in S312, the CPU 21 obtains the event information linked to the anomaly occurrence node determined in S310 and the date and time when the anomaly occurred, via the Internet or the like. Next, in S322, the CPU 21 extracts causality information, which represents an anomaly at the anomaly transition node having causality with the anomaly occurrence node determined in S310 and is associated with the same event information as that obtained in S312, and counts the number of extracted anomalies for respective anomaly transition nodes having the causality. After the step of S322 ends, the process proceeds to S330.

In the anomaly detection apparatus 7 configured as described above, the causality extraction section 33 obtains event information representing the cause of an anomaly that has occurred at the anomaly occurrence node and associates the obtained event information with causality information. Then, when the anomaly detection section 32 determines that there is an anomaly occurrence node, the anomaly estimation section 34 obtains event information representing the anomaly that has occurred at the anomaly occurrence node and extracts the past causality information associated with the same event information as the obtained event information to estimate a transition of the anomaly.

Thus, the anomaly detection apparatus 7 can extract causality information with excluding anomalies that have not occurred .due to the same event, thereby improving the accuracy in estimating an anomaly transition.

In the embodiment described above, S210 to S260 correspond to steps as an information generation section, S310 to S330 correspond to steps as an estimation section, and the event information corresponds to anomaly cause information.

Third Embodiment

Hereinafter, the third embodiment will be described with reference to the drawings. In the third embodiment, parts different from those of the first embodiment will be described. The same reference numeral is added to a component common to the first embodiment.

An anomaly detection apparatus 1 of the third embodiment differs from that of the first embodiment in that the causality extraction process and the anomaly estimation process are modified.

Figure 21:
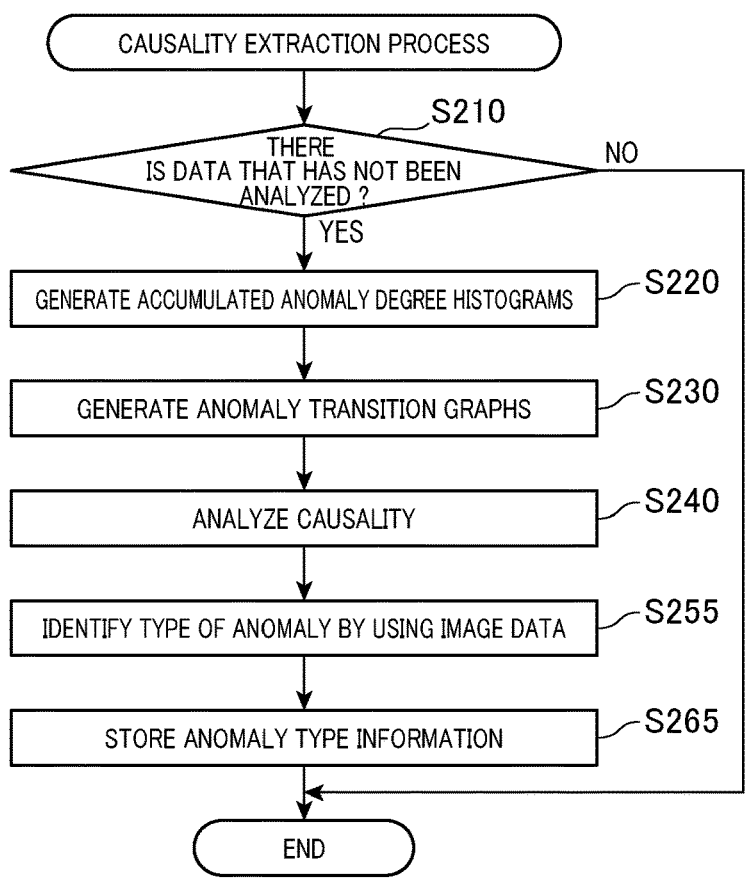
FIG. 21 is a flowchart of a causality extraction process according to a third embodiment.

As shown in FIG. 21, the causality extraction process of the third embodiment differs from that of the first embodiment in that steps of S255 and S265 are added.

That is, when the step of S240 ends, in S255, the CPU 21 uses image data obtained at the date and time when the anomaly occurred and at the anomaly occurrence node of the anomaly for which causality has analyzed in S240 to identify the type of the anomaly at the anomaly occurrence node (e.g. a traffic hold-up or an accident). Then, in S265, the CPU 21 stores anomaly type information representing the type of anomaly identified in S255 in the causality storing database 43 in a state where the anomaly type information is associated with the causality information stored in S240, and halts the causality extraction process.

Figure 22:
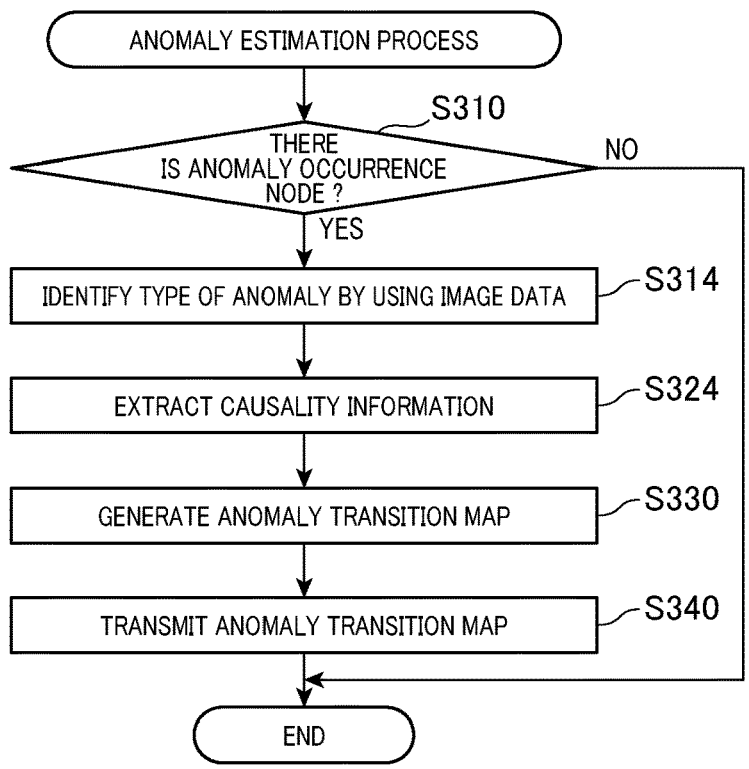
FIG. 22 is a flowchart of an anomaly estimation process according to the third embodiment.

As shown in FIG. 22, an anomaly estimation process of the third embodiment differs from that of the first embodiment in that the step of S320 is omitted and steps of S314 and S324 are added.

That is, if there is an anomaly occurrence node in S310, in S314, the CPU 21 identifies the type of the anomaly at the anomaly occurrence node by using the image data obtained at the date and time when the anomaly occurred and at the anomaly occurrence node determined in S310. Next, in S324, the CPU 21 extracts the causality information, which represents the anomaly at the anomaly transition node having causality with the anomaly occurrence node and is associated with the anomaly type information representing the type of anomaly identified in S314, from the causality storing database 43 and counts the number of extracted anomalies for respective anomaly transition nodes having the causality. When the step of S324 ends, the process proceeds to S330.

In the anomaly detection apparatus 7 configured as described above, the causality extraction section 33 uses the image data obtained at the date and time when the anomaly occurred and at the anomaly occurrence node to identify the type of the anomaly that has occurred at the anomaly occurrence node, and associates the anomaly type information representing the type of the identified anomaly and the causality information. Then, when the anomaly detection section 32 determines that there is an anomaly occurrence node, the anomaly estimation section 34 uses image data to identify the type of the anomaly that has occurred at the anomaly occurrence node, and extract the past causality information associated with the same anomaly type information as the type of the identified anomaly to estimate a transition of the anomaly.

Thus, the anomaly detection apparatus 7 can extract causality information with excluding anomalies that have not occurred due to the same type of anomaly, thereby improving the accuracy in estimating a transition of the anomaly.

In the embodiment described above, S210 to S265 correspond to steps as an information generation section, and S310 to S330 correspond to an estimation section.

Fourth Embodiment

Hereinafter, the fourth embodiment will be described with reference to the drawings. In the fourth embodiment, parts different from those of the first embodiment will be described. The same reference numeral is added to a component common to the first embodiment.

Figure 26:
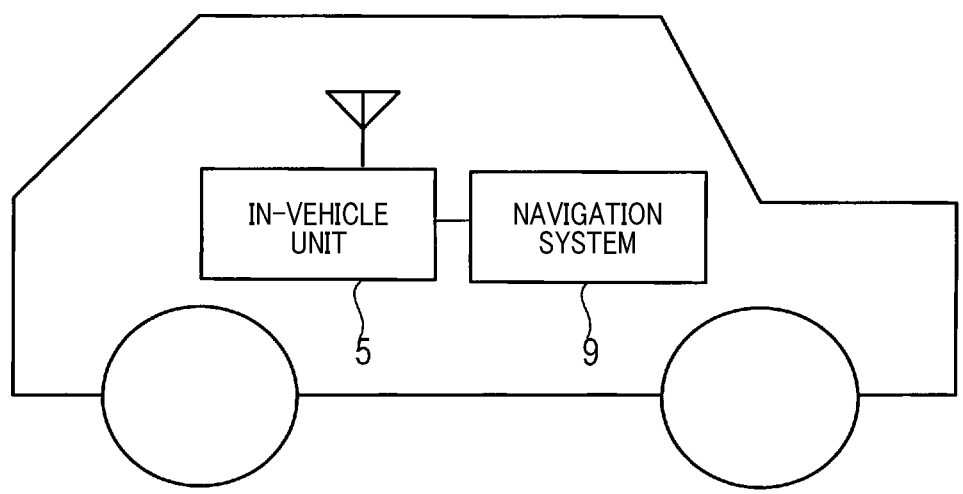
FIG. 26 is a diagram showing an in-vehicle unit and a navigation system installed in a vehicle.

As shown in FIG. 26, in an anomaly detection system 1 of the fourth embodiment, an automobile (own vehicle) includes a navigation system 9 connected so as to obtain data from the in-vehicle unit 5.

The navigation system 9 obtains map data from a map storage medium storing road map data and various types of information and detects the current position of the own vehicle based on, for example, GPS signals received via a GPS antenna (not shown).

The navigation system 9 performs control for displaying the current position of the own vehicle on a display screen and control for guiding a route from the current position to the destination.

Figure 27:
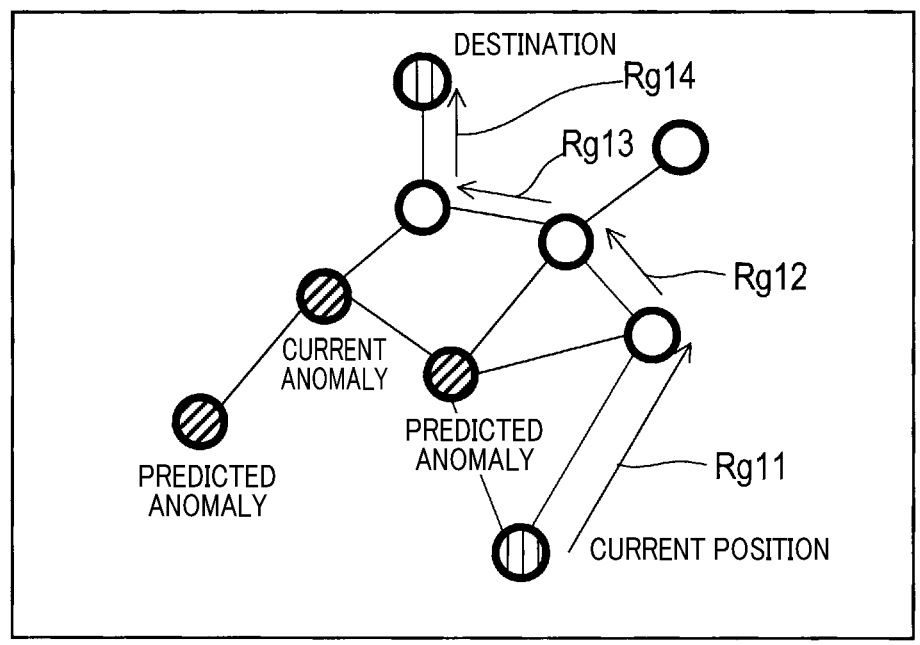
FIG. 27 is a diagram showing display by the navigation system according to a fourth embodiment.

Then, when the navigation system 9 obtains an anomaly transition map generated by the anomaly detection apparatus 7 from the in-vehicle unit 5, as shown in FIG. 27, the navigation system 9 displays "current anomaly" in the vicinity of a node at which an anomaly has occurred (hereinafter, referred to as anomaly occurrence node), and displays "predicted anomaly" in the vicinity of an anomaly transition node. Thereby, the navigation system 9 informs the driver of a message that occurrence of an anomaly is predicted at the anomaly occurrence node.

When the navigation system 9 obtains the anomaly transition map generated by the anomaly detection apparatus 7 from the in-vehicle unit 5, if a route is being guided, as shown in FIG. 27, the navigation system 9 displays an avoidance route avoiding the anomaly occurrence node and the anomaly transition node. In FIG. 27, guiding routes Rg11, Rg12, Rg13, and Rg14 from the current position to the destination are set so as to avoid vicinities of the anomaly occurrence node and the anomaly transition node.

The navigation system 9 configured as described above is installed in a vehicle, and obtains an anomaly transition map representing the result of estimation by the anomaly detection apparatus 7 to display information by which positions of the anomaly occurrence node and the anomaly transition node can be identified.

As described above, the navigation system 9 informs, in advance, the driver of the point at which it is predicted that an anomaly occurs, whereby the driver can recognize that an anomaly may occur at the anomaly transition node. Thus, the driver can be prevented from meeting with an accident or a condition that is almost an accident due to the anomaly at the anomaly transition node.

In addition, the navigation system 9 displays an avoidance route avoiding the anomaly occurrence node and the anomaly transition node. Hence, the navigation system 9 can prevent the driver from meeting an accident due to the anomalies that have occurred at the anomaly occurrence node and the anomaly transition node. In addition, the navigation system 9 displays the anomaly occurrence node, the anomaly transition node, and the avoidance route, whereby grounds that the route avoiding the anomaly occurrence node is set can be provided for the driver.

In the embodiment described above, the navigation system 9 corresponds to a display apparatus, the anomaly transition map corresponds to estimation information, the anomaly occurrence node corresponds to a current anomaly occurrence point, and the anomaly transition node corresponds to a current anomaly transition point (current anomaly transfer point).

In addition, the positions of the anomaly occurrence node and the anomaly transition node shown in FIG. 27 correspond to anomaly position specifying information, the position of the anomaly occurrence node shown in FIG. 27 corresponds to occurrence position information, and the position of the anomaly transition node shown in FIG. 27 corresponds to transition position information (transfer position information).

It will be appreciated that the present invention is not limited to the configurations described above, but any and all modifications, variations or equivalents, which may occur to those who are skilled in the art, should be considered to fall within the scope of the present invention.

Modification 1

For example, in the above embodiment, a topic proportion is used as a feature amount calculated for determining the occurrence of an anomaly. However, the feature amount is not limited to the topic proportion but may be a value by which the occurrence of an anomaly can be determined.

Modification 2

Figure 23:
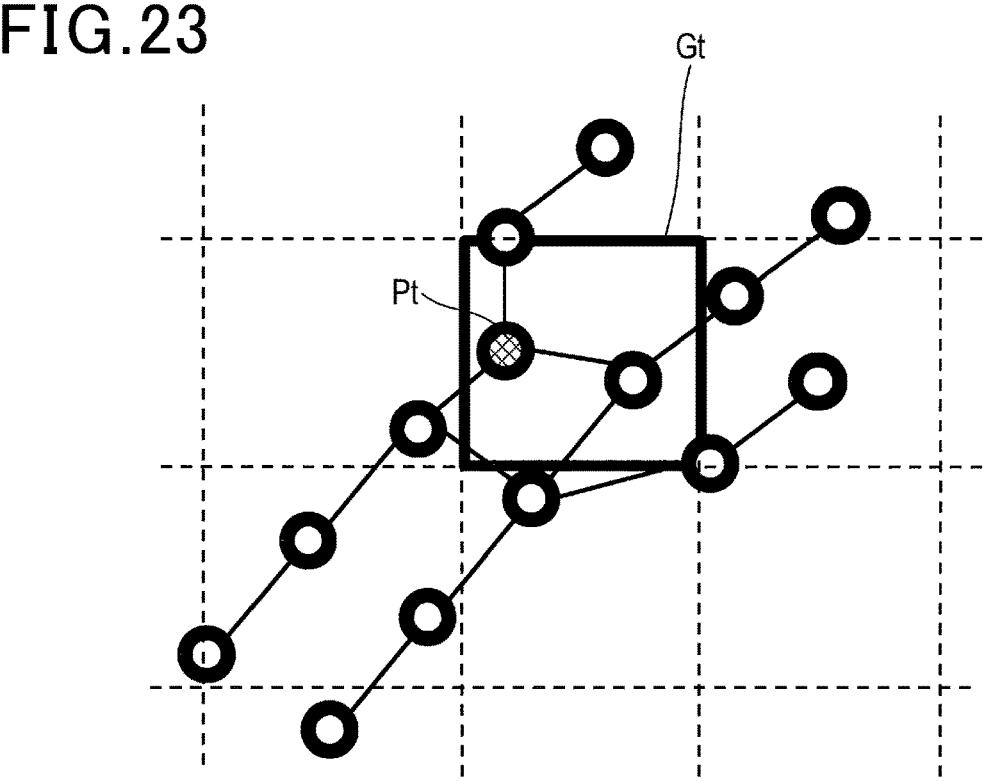
FIG. 23 is a diagram showing the periphery of an anomaly occurrence node according to another embodiment.

In the above embodiment, as shown in FIG. 9, the inside of the periphery setting circle Ca having the periphery setting radius Ra and centering on the anomaly occurrence node Pt is determined as the periphery of the anomaly occurrence node. However, as shown in FIG. 23, a map may be divided into rectangular grids to determine the inside of a grid Gt including the anomaly occurrence node Pt as the periphery of the anomaly occurrence node.

Modification 3

Figure 24:
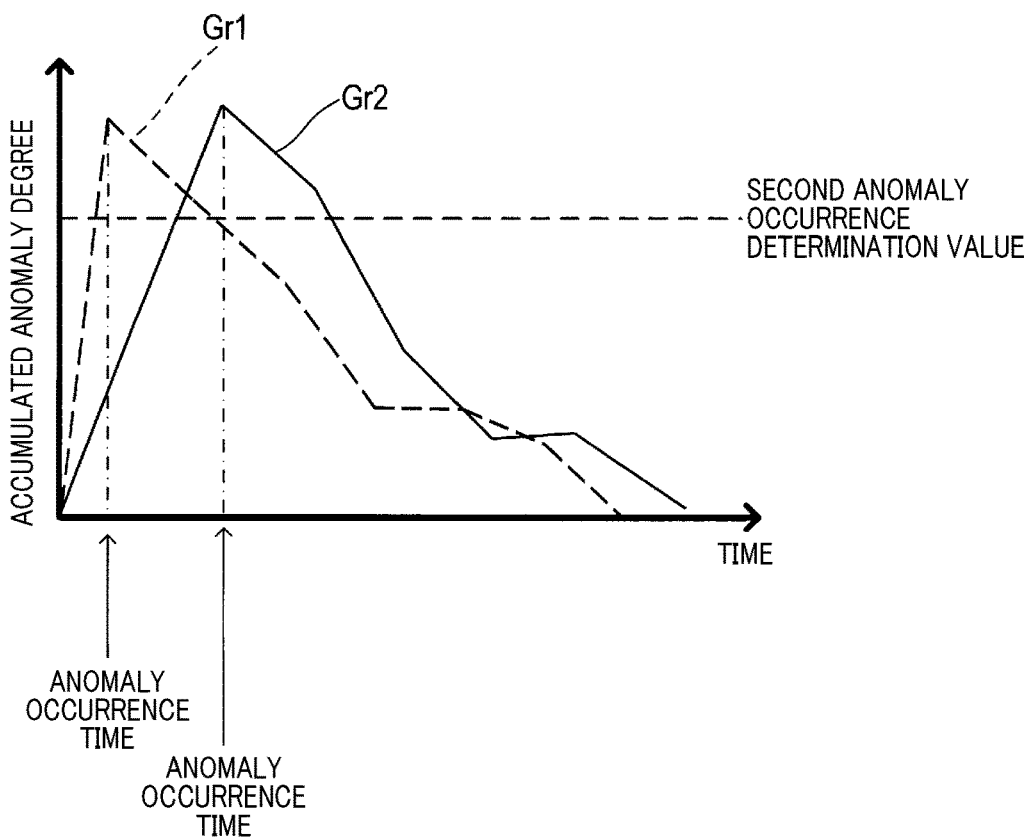
FIG. 24 is a diagram illustrating a comparison between anomaly transition graphs according to another embodiment.

In the above embodiment, causality is analyzed by using a Granger causality model. As a simple method for determining causality, as shown in FIG. 24, causality may be determined by comparing the anomaly occurrence time calculated by using an anomaly transition graph of the anomaly occurrence node with the anomaly occurrence times calculated by using anomaly transition graphs of one or more nodes around the anomaly occurrence node. That is, when an anomaly has also occurred around the anomaly occurrence node after an anomaly has occurred at the anomaly occurrence node, it is determined that causality is established. FIG. 24 illustrates a state where the anomaly occurrence time calculated by using an anomaly transition graph Gr1 of the anomaly occurrence node and the anomaly occurrence time calculated by using an anomaly transition graph Gr2 of the node in the vicinity of the anomaly occurrence node are compared with each other.

In addition, to accurately determine the causality, the anomaly occurrence times may be compared after presence or absence of causality is determined by causality analysis. That is, when it is determined by causality analysis that causality is present, and it is determined anomaly has also occurred around the anomaly occurrence node after anomaly occurred at the anomaly occurrence node, the causality information described above may be stored in the causality storing database 43.

Modification 4

In the above embodiment, the causality information representing the anomaly for which it is determined that causality is established with the anomaly, which has occurred at the anomaly occurrence node, is stored in the causality storing database 43 in a state where the anomaly identification number same as that stored in the road anomaly storing database 42 is added to the causality information. However, an identification number for determining a similar anomaly may be added by calculating the degree of similarity of the anomaly based on a topic proportion. Thus, when an anomaly is estimated, the time required for extracting the information representing a similar anomaly from the causality storing database 43 can be shortened. In addition, since transition of an anomaly can be estimated by using only the similar anomaly, the accuracy in the estimation can be improved.

Modification 5

In the above embodiment, data is extracted which has causality with the anomaly that has occurred in the anomaly occurrence node, and the relationship of transition (transfer) between the anomalies is mapped based on the number of extracted anomalies. In this case, the data may be extracted which has, in addition to the causality with the anomaly that has occurred in the anomaly occurrence node, causality with at least one of the degrees of anomaly (e.g. the accumulated degree of anomaly) and the anomaly feature amount (e.g. a topic proportion). Thus, data can be extracted with excluding anomalies that are not similar to the anomaly that has occurred at the anomaly occurrence node, thereby improving the accuracy in estimating an abnormal transition. In addition, the extraction may be limited depending on a time period, and restriction may be provided so that, for example, too old data is not extracted. Furthermore, since anomaly transition is managed by anomaly identification numbers, if at least one anomaly having causality can be extracted, the related anomaly can be easily extracted based on the anomaly identification number.

Modification 6

In the above embodiment, as shown in FIG. 13, an anomaly transition map is generated such that as the number of extracted anomalies increases, the corresponding arrow becomes thicker.

Figure 25:
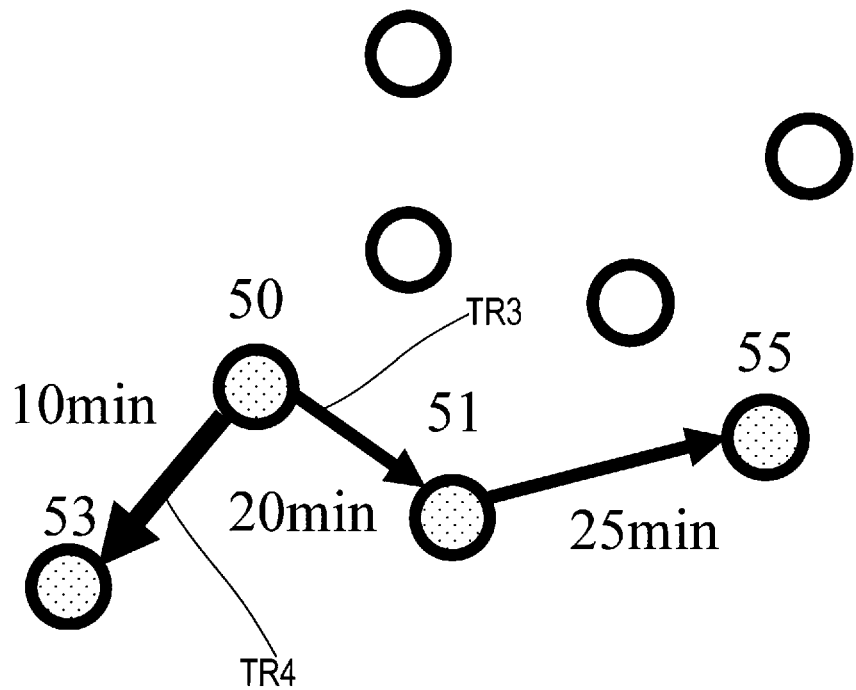
FIG. 25 is a diagram illustrating an anomaly transition map according to another embodiment.

However, as shown in FIG. 25, instead of the number of extracted anomalies, anomaly transition time (anomaly transfer time) required for the transition of the anomaly from the anomaly occurrence node to the anomaly transition node may be indicated to generate an anomaly transition map such that as the anomaly transition time is shorter, the corresponding arrow becomes thicker. In FIG. 25, an arrow TR3, whose starting point is the node having a node ID of 50 and whose end point is the node having a node ID of 51, indicates a transition of anomaly from the node having a node ID of 50. In the vicinity of the arrow TR3, "20 min" is written, which indicates anomaly transition time required for the transition of the anomaly from the node having a node ID of 50 to the node having a node ID of 51.

Similarly, an arrow TR4 indicates a transition of the anomaly from the node having a node ID of 50 to the node having a node ID of 53. In the vicinity of the arrow TR4, "10 min" is written, which indicates anomaly transition time required for the transition of the anomaly from the node having a node ID of 50 to the node having a node ID of 53.

In addition, instead of the number of extracted anomalies and the anomaly transition time, a causality degree may be indicated. The causality degree indicates the degree of causality between the anomaly of the anomaly occurrence node and the anomaly of the anomaly transition node and is calculated by causality analysis. It is noted that the anomaly transition time and the causality degree may be an average of data of a plurality of vehicles, typical data, or data of all the plurality of vehicles.

In addition, instead of the anomaly transition time and the causality degree, a weighted average of the anomaly transition time and the causality degree may be indicated.

Modification 7

In the above embodiment, as shown in FIG. 18, information representing a prediction of time when an anomaly would occur is displayed, such as "about 10 minutes later" and "about 15 minutes later". However, information representing prediction of time when the anomaly would disappear may be displayed.

Modification 8

Figure 28:
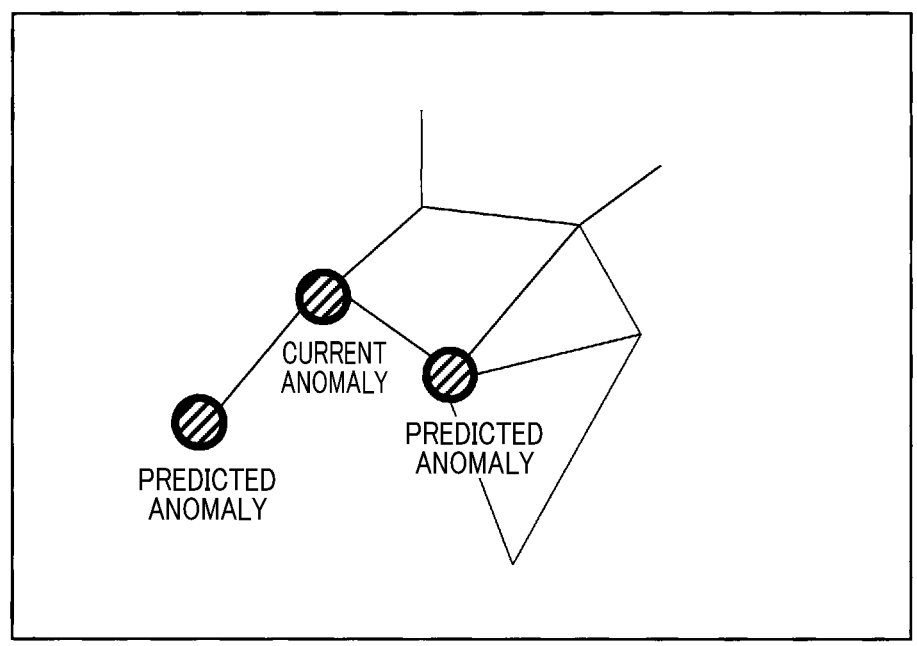
FIG. 28 is a diagram showing display by the navigation system according to an eighth modification.

In the fourth embodiment, as shown in FIG. 27, the navigation system 9 displays roads represented by nodes and links. However, as shown in FIG. 28, the navigation system 9 may represent roads only by links, and may display only the anomaly occurrence node and the anomaly transition node. Alternatively, the navigation system 9 may perform superimposed display of the anomaly occurrence node and the anomaly transition node on a common road map.

Modification 9

In the fourth embodiment, as shown in FIG. 27, the navigation system 9 displays the anomaly occurrence node and the anomaly transition node. However, time concerning the anomaly transition node may be displayed. The time to be displayed may be anomaly occurrence predicted time that is time at which it is predicted that an anomaly occurs, an occurrence time period during which the anomaly has occurred, or anomaly end predicted time that is time at which it is predicted that the anomaly ends.

As described above, the navigation system 9 displays occurrence time specifying information by which the time when an anomaly occurs at the anomaly transition node can be specified. Thereby, the driver can recognize the time when an occurrence occurs. Thus, the driver can easily plan a route avoiding the anomaly transition node.

Modification 10

Figure 29:
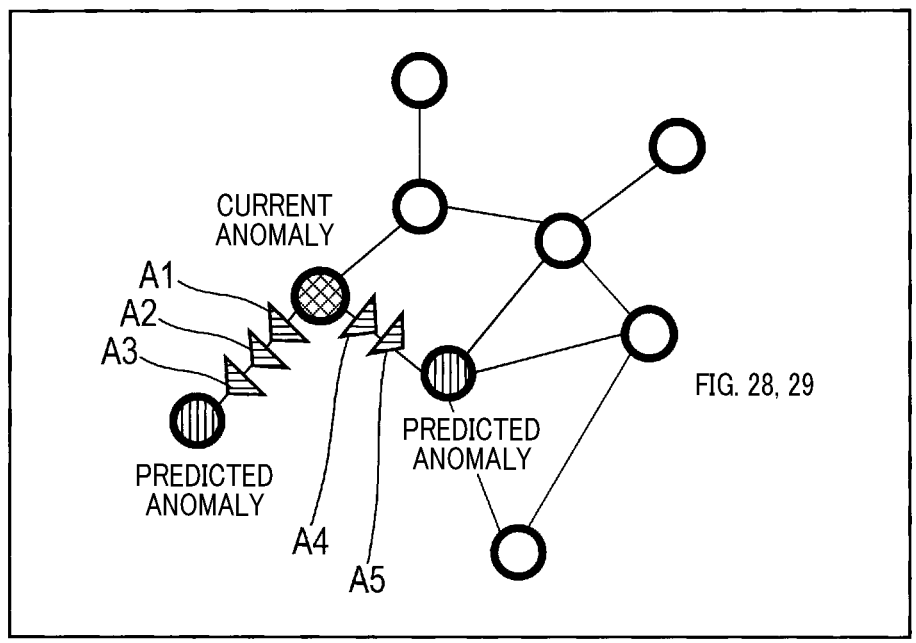
FIG. 29 is a diagram showing display by the navigation system according to a tenth modification.

In the fourth embodiment, as shown in FIG. 27, the navigation system 9 displays the anomaly occurrence node and the anomaly transition node. However, as shown in FIG. 29, the navigation system 9 may display an arrow so as to move from the anomaly occurrence node to the anomaly transition node. In FIG. 29, to display the movement to the anomaly transition node positioned at the lower left with respect to the anomaly occurrence node, the navigation system 9 first displays an arrow A1. Next, the navigation system 9 erases the arrow A1, and thereafter displays an arrow A2. Furthermore, the navigation system 9 erases the arrow A2, and thereafter displays an arrow A3. In this manner, the navigation system 9 displays the arrow A1, the arrow A2, and the arrow A3 in series to represent the transition of an anomaly. Then, the navigation system 9 represents the speed of the transition of the anomaly by the transition time from the display of the arrow A1 to the display of the arrow A3. For example, a short transition time may indicate that the time when an anomaly occurs at the anomaly transition node arrives early. Long transition time may indicate that the time when an anomaly occurs at the anomaly transition node arrives late. It is noted that in FIG. 29, the navigation system 9 distinguishably displays the anomaly transition node and the anomaly occurrence node. For example, the navigation system 9 displays the anomaly transition node by blinking or the like. In addition, in FIG. 29, to display the movement to the anomaly transition node positioned at the lower right with respect to the anomaly occurrence node, the navigation system 9 first displays an arrow A4. Next, the navigation system 9 erases the arrow A4, and thereafter displays an arrow A5.

As described above, the navigation system 9 displays an arrow so as to move in animation, whereby the driver can intuitively obtain the time when an anomaly occurs at the anomaly transition node.

Modification 11

Figure 30:
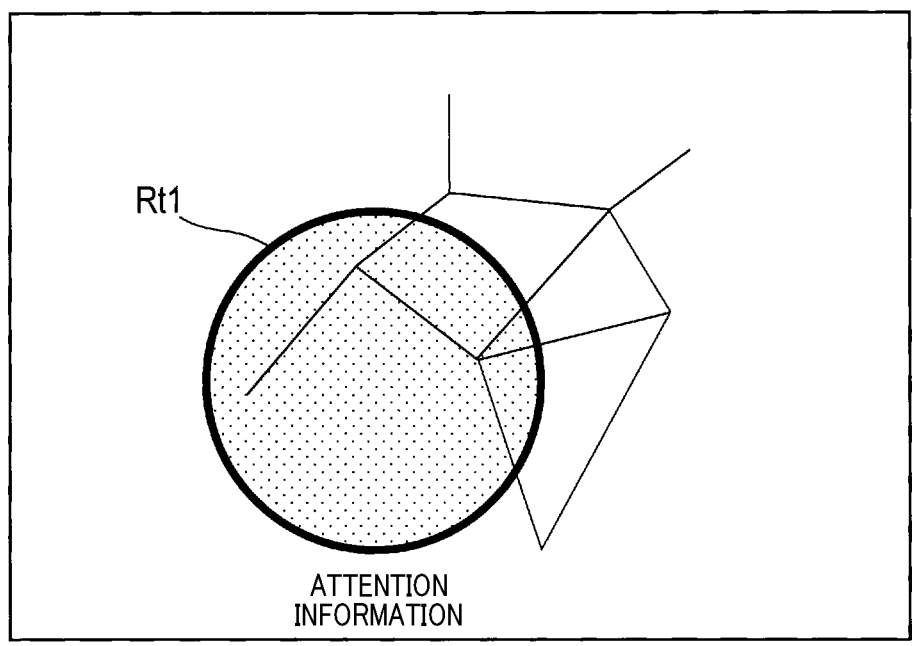
FIG. 30 is a diagram showing display by the navigation system according to an eleventh modification.

In the fourth embodiment, as shown in FIG. 27, the navigation system 9 displays the anomaly occurrence node and the anomaly transition node. However, as shown in FIG. 30, the navigation system 9 may display an area including the anomaly occurrence node and the anomaly transition node as an anomaly. In FIG. 30, the navigation system 9 displays a circular area Rt1 including the anomaly occurrence node and the anomaly transition node as an anomaly.

As described above, the navigation system 9 displays anomaly area information representing the circular area Rt1 including the position of the anomaly occurrence node and the position of the anomaly transition node. Hence, the navigation system 9 can indicate an anomaly occurrence point not by a pinpoint but by a wide area. Hence, the driver can be prevented from approaching the anomaly. In addition, according to such display, the navigation system 9 can have the driver understand that an anomaly may occur also at the point where an anomaly was not determined in the past. For example, when a flood occurs at the anomaly occurrence node and the anomaly transition node due to heavy rain, it is desirable not to avoid the flood at a pinpoint but not to approach the anomaly occurrence node and the anomaly transition node as much as possible. Since the navigation system 9 performs display as shown in FIG. 30, the driver can easily avoid the anomaly. It is noted that the area Rt1 shown in FIG. 30 corresponds to the anomaly position specifying information and the anomaly area information.

It is noted that the area including the anomaly occurrence node and the anomaly transition node is not limited to a circular shape, but may be a shape including the anomaly occurrence node and the anomaly transition node, for example, a rectangular shape, or a shape surrounding the anomaly occurrence node and the anomaly transition node along roads.

Modification 12

Figure 31:
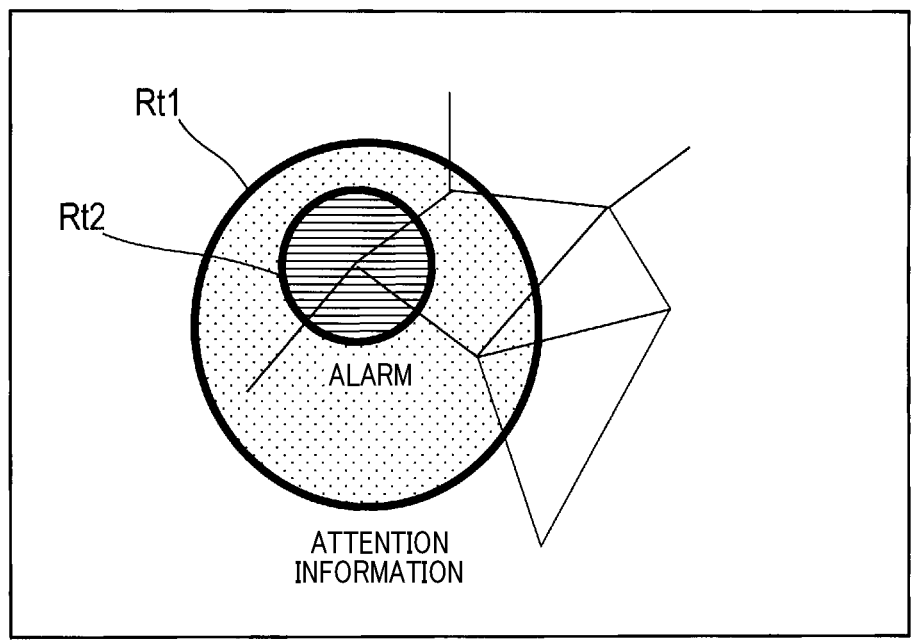
FIG. 31 is a diagram showing display by the navigation system according to a twelfth modification.

In the eleventh modification, the navigation system 9 displays the circular area Rt1 including the anomaly occurrence node and the anomaly transition node as an anomaly. However, as shown in FIG. 31, the navigation system 9 may display the area including only the anomaly occurrence node so as to be distinguished from the area including the anomaly transition node. In FIG. 31, the navigation system 9 displays the circular area Rt1 including the anomaly occurrence node and the anomaly transition node as attention information and displays the circular area Rt2 including the anomaly occurrence node as an alarm. In FIG. 31, the area Rt1 and the area Rt2 are displayed with different colors.

In FIG. 31, the navigation system 9 distinguishably uses two colors. However, the periphery of the point at which the probability of occurrence of an anomaly is high in the area Rt1 may be displayed, for example, with a gradation in such a manner as contour fines so that the color becomes darker.

As described above, the navigation system 9 distinguishably displays the area Rt2 including the position of the anomaly occurrence node and the area Rt1 including the position of the anomaly transition node. Thereby, the navigation system 9 can allow the driver to distinguishably recognize the area including the position of the anomaly occurrence node and the area including the position of the anomaly transition node. Thus, the driver can plan a route avoiding the anomaly transition node, considering the position of the anomaly occurrence node and the position of the anomaly transition node. It is noted that the area Rt1 and the area Rt2 shown in FIG. 31 correspond to anomaly position specifying information. The area Rt2 shown in FIG. 31 corresponds to an anomaly occurrence area. The area Rt1 shown in FIG. 31 corresponds to an anomaly transition area (anomaly transfer area).

Modification 13

Figure 32:
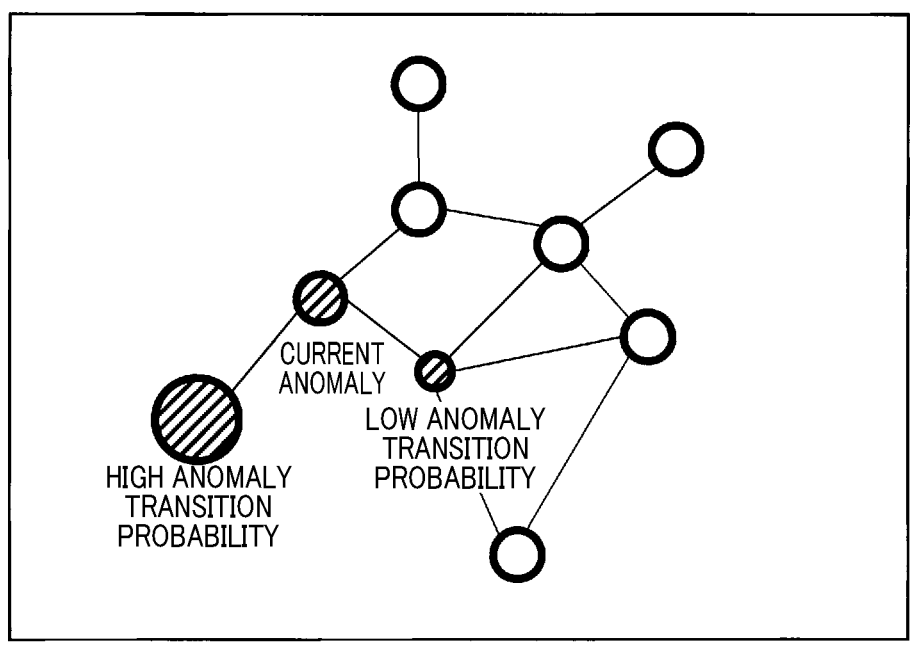
FIG. 32 is a first diagram showing display by the navigation system according to a thirteenth modification.

In the fourth embodiment, as shown in FIG. 27, the navigation system 9 displays the anomaly occurrence node and the anomaly transition node. However, as shown in FIG. 32, the navigation system 9 may change the size of an icon representing the anomaly transition node depending on an anomaly transition probability (anomaly transfer probability). In FIG. 32, the navigation system 9 displays the icon representing the anomaly transition node so as to be larger, as the anomaly transition probability becomes higher. The anomaly transition probability is calculated based on the number of extracted anomalies extracted as anomalies having causality between the anomaly transition node and the anomaly occurrence node so as to be larger, as the number of extracted anomalies becomes larger. It is noted that the shape of the icon representing the anomaly transition node is not limited to be a circular shape.

Figure 33:
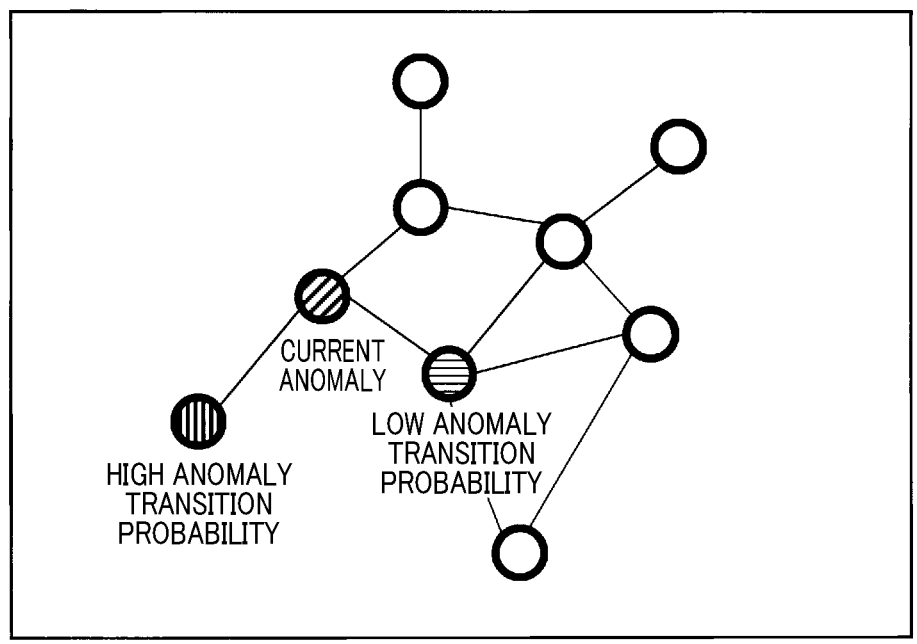
FIG. 33 is a second diagram showing display by the navigation system according to a thirteenth modification.

In addition, as shown in FIG. 33, the navigation system 9 may change the color of the icon representing the anomaly transition node depending on the anomaly transition probability. In FIG. 33, the navigation system 9 displays an icon of the anomaly transition node having a high anomaly transition probability with red color, and displays an icon of the anomaly transition node having a low anomaly transition probability with blue color.

As described above, the navigation system 9 highlights the anomaly transition node having a high anomaly transition probability. Thereby, the navigation system 9 can allow the driver to recognize the anomaly transition node having a high anomaly transition probability. Thus, the driver can plan a route avoiding the anomaly transition node, considering the anomaly transition probability.

Modification 14

Figure 34:
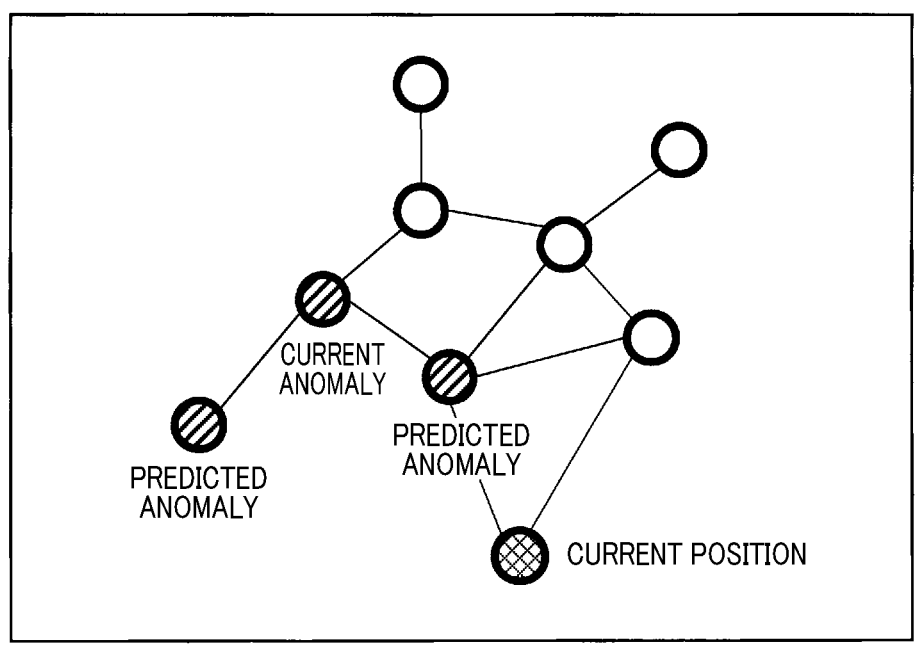
FIG. 34 is a diagram showing display by the navigation system according to a fourteenth modification.
Figure 35:
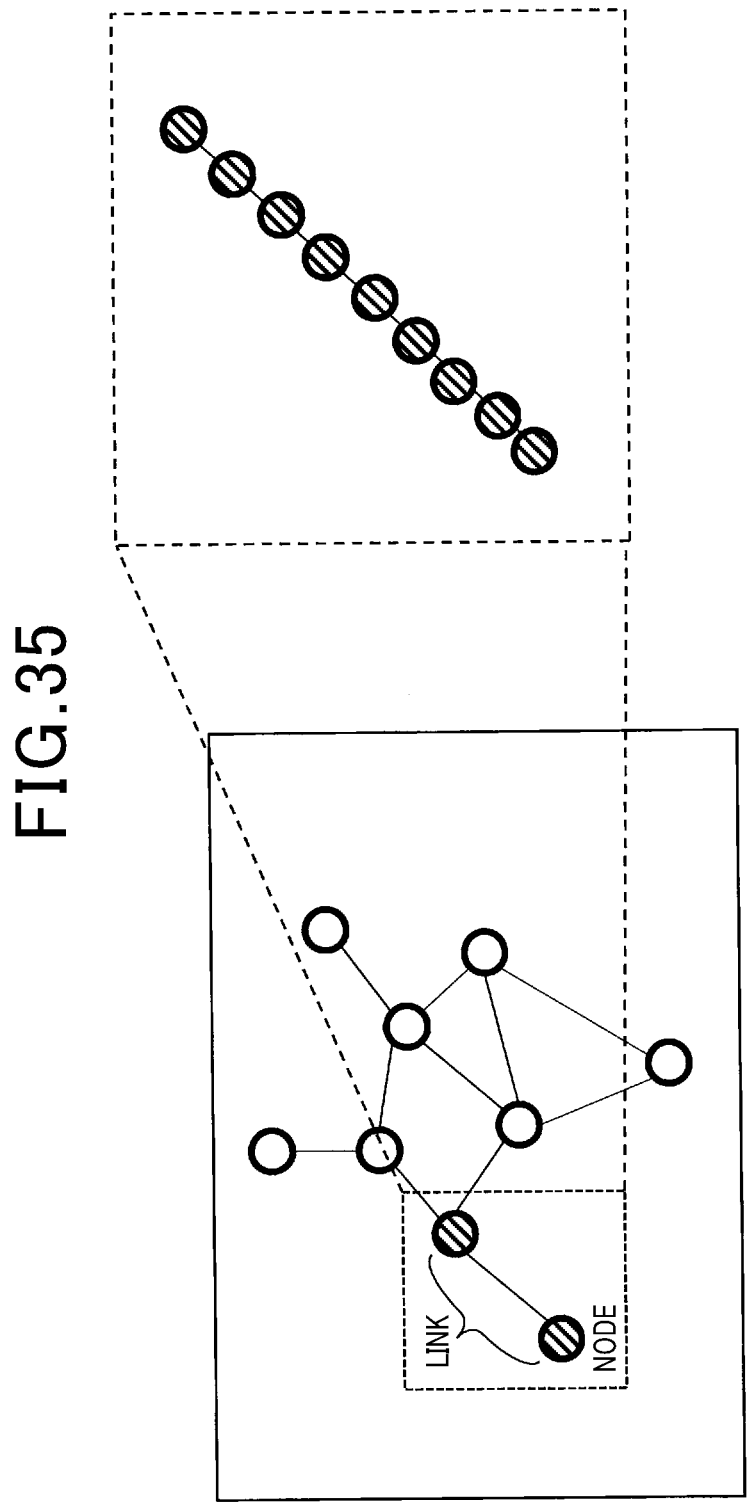
FIG. 35 is a diagram showing display by the navigation system according to a fifteenth modification.

In the fourth embodiment, as shown in FIG. 27, the navigation system 9 displays the anomaly occurrence node and the anomaly transition node. However, as shown in FIG. 34, the navigation system 9 may display only the anomaly transition node at which the vehicle is likely to arrive and which is included in one or more anomaly transition nodes, based on the current position of the vehicle. For example, regarding the anomaly transition node to which it is predicted that transition of the anomaly is made 30 minutes later, if the vehicle cannot arrive at the anomaly transition node from the current position within 30 minutes, the navigation system 9 does not display the anomaly transition node.

As described above, the navigation system 9 displays only the anomaly occurrence node at which the vehicle having the navigation system 9 may arrive and which is included in one or more anomaly transition nodes. Thus, the navigation system 9 can be prevented from providing unnecessary information to the driver.

Modification 15

In the fourth embodiment, as shown in FIG. 27, the navigation system 9 displays nodes as branching points of roads. The nodes are not limited to being set as branching points of roads. As shown in FIG.

35, nodes may be disposed in a link with minute spaces, for example, 1 m, and the anomaly detection apparatus 7 may determine the occurrence of an anomaly and the transition (transfer) of the anomaly for the respective plurality of nodes. Thus, the anomaly detection apparatus 7 can determine the occurrence of an anomaly and the transition of the anomaly on roads more accurately.

Modification 16

In the fourth embodiment, as shown in FIG. 27, the navigation system 9 displays the anomaly occurrence node and the anomaly transition node. However, a display apparatus displaying the anomaly occurrence node and the anomaly transition node is not limited to a navigation system. For example, the display apparatus may be a smartphone in which a maps application or the like is installed. It is noted that the maps application may not have a navigation function.

In addition, functions of one component in the embodiment may be divided into a plurality of components, or functions of a plurality of components may be activated by one component. Part of the configuration of the embodiment may be omitted. At least part of the configuration of the embodiment may be added to the configuration of another embodiment described above, and may be replaced from the configuration of another embodiment described above. It is noted that various aspects included in technical ideas specified by the claims are embodiments of the present disclosure.

In addition to the anomaly detection apparatus 7 described above, aspects of the present disclosure can be achieved by various forms, such as a system that includes the anomaly detection apparatus 7 as a component, a program for allowing a computer to function as the anomaly detection apparatus 7, a recording medium storing the program, and an anomaly estimation method.

Hereinafter, an aspect of the above-described embodiments will be summarized.

As an aspect of the embodiment, an anomaly estimation apparatus (7) is provided which includes a collection section (S10), a feature amount calculation section (S20, S30), an anomaly determination section (S110 to S140), an accumulation section (S150, S160), an information generation section (S210 to S265), and an estimation section (S310 to S330).

The collection section is configured to repeatedly collect vehicle data concerning conditions of a plurality of vehicles for the respective vehicles.

The feature amount calculation section is configured to calculate a feature amount from the vehicle data collected by the collection section and store the feature amount and a place corresponding to the feature amount in a state where the feature amount is associated with the place.

The anomaly determination section is configured to determine whether or not an anomaly occurrence point, at which an anomaly has occurred, is present at a present time based on the feature amount calculated by the feature amount calculation section.

The accumulation section is configured to, if the anomaly determination section determines that the anomaly occurrence point is present at the present time, use the vehicle data at the anomaly occurrence point and the vehicle data at an anomaly periphery point, which is a point around the anomaly occurrence point, to generate estimation data, which is previously set to estimate transition of the anomaly from the anomaly occurrence point to the anomaly periphery point, and store the generated estimation data.

The information generation section is configured to use the estimation data stored by the accumulation section to generate causality information representing causality between an anomaly that has occurred at the anomaly occurrence point and an anomaly that has occurred at the anomaly periphery point.

The estimation section is configured to, if the anomaly determination section determines that the anomaly occurrence point is present at the present time, use the causality information generated by the information generation section in the past to estimate transition of the anomaly from the anomaly occurrence point, at which it is determined to be present at the present time by the anomaly determination section, to the anomaly periphery point.

The anomaly estimation apparatus configured as described above stores data for estimation (estimation data) generated by using the vehicle data at the anomaly occurrence point and the anomaly peripheral point to generate causality information by using the stored estimation data. The causality information represents causality between the anomaly caused at the anomaly occurrence point and the anomaly caused at the anomaly peripheral point. Hence, if determining that there is an anomaly occurrence point at the present time, the anomaly estimation apparatus can estimate the point to which transition of the anomaly is made (i.e. as anomaly peripheral point) from the anomaly occurrence point by extracting the past causality information representing causality with the anomaly, which has occurred at the anomaly occurrence point. Thus, when an anomaly occurs, the anomaly estimation apparatus can, by accumulating causality information, quickly estimate a transition of the anomaly by a simple method and quickly specify the range of the influence of the anomaly, whereby an alternative route can be quickly calculated.

What is claimed is:

1. An anomaly estimation apparatus, comprising:
a collection section that is configured to repeatedly collect vehicle data concerning conditions of a plurality of vehicles for the respective vehicles;
a feature amount calculation section that is configured to calculate a feature amount from the vehicle data collected by the collection section and store the feature amount and a place corresponding to the feature amount in a state where the feature amount is associated with the place;
an anomaly determination section that is configured to determine whether or not an anomaly occurrence point, at which an anomaly has occurred, is present at a present time based on the feature amount calculated by the feature amount calculation section;
an accumulation section that is configured to, if the anomaly determination section determines that the anomaly occurrence point is present at the present time, use the vehicle data at the anomaly occurrence point and the vehicle data at an anomaly periphery point, which is a point around the anomaly occurrence point, to generate estimation data, which is previously set to estimate transition of the anomaly from the anomaly occurrence point to the anomaly periphery point, and store the generated estimation data;
an information generation section that is configured to use the estimation data stored by the accumulation section to generate causality information representing causality between an anomaly that has occurred at the anomaly occurrence point and an anomaly that has occurred at the anomaly periphery point; and
an estimation section that is configured to, if the anomaly determination section determines that the anomaly occurrence point is present at the present time, use the causality information generated by the information generation section in the past to estimate transition of the anomaly from the anomaly occurrence point, at which it is determined to be present at the present time by the anomaly determination section, to the anomaly periphery point.

2. The anomaly estimation apparatus according to claim 1, wherein
the anomaly determination section uses the feature amount calculated by the feature amount calculation section at the present time as a current feature amount, uses the feature amount, which is calculated before the current feature amount is calculated, as a past feature amount, and compares the current feature amount with the past feature amount to determine whether the anomaly occurrence point is present at the present time.

3. The anomaly estimation apparatus according to claim 1, wherein
the accumulation section determines that a point in a periphery determination area, which is previously set so as to include the anomaly occurrence point, is the periphery of the anomaly occurrence point.

4. The anomaly estimation apparatus according to claim 1, wherein
the estimation section extracts the causality information in the past at the anomaly periphery point having causality with the anomaly that has occurred at the anomaly occurrence point, and obtains information representing the number of extracted anomalies.

5. The anomaly estimation apparatus according to claim 1, wherein
the information generation section generates the causality information so as to include at least one of a degree of anomaly indicating a degree of the anomaly caused at the anomaly occurrence point and the feature amount obtained when the anomaly has occurred at the anomaly occurrence point, and
the estimation section uses at least one of the degree of anomaly and the feature amount included in the causality information in the past to extract the causality information of an anomaly similar to the anomaly at the anomaly occurrence point, which is determined to be present at the present time by the anomaly determination section, and estimates the transition of the anomaly from the anomaly occurrence point to the anomaly periphery point.

6. The anomaly estimation apparatus according to claim 1, wherein the information generation section obtains anomaly cause information representing a cause of the anomaly that has occurred at the anomaly occurrence point and associates the obtained anomaly cause information with the generated causality information, and when anomaly determination section determines that the anomaly occurrence point is present, the estimation section obtains the anomaly cause information representing the anomaly that has occurred at the anomaly occurrence point, extracts the causality information in the past associated with the same anomaly cause information as the obtained anomaly cause information to estimate the transition of the anomaly from the anomaly occurrence point to the anomaly periphery point.

7. The anomaly estimation apparatus according to claim 1, wherein the data collected by the collection section includes image data of the periphery of the vehicle captured by a camera installed in the vehicle, the information generation section is configured to use the image data to identify a type of the anomaly that has occurred at the anomaly occurrence point, and to associate anomaly type information representing the type of the identified anomaly with the generated causality information, and when the anomaly determination section determines that the anomaly occurrence point is present, the estimation section uses the image data to identify the type of the anomaly that has occurred at the anomaly occurrence point, and extracts the causality information in the past associated with the anomaly type information that is the same as the identified type of the anomaly to estimate the transition of the anomaly from the anomaly occurrence point to the anomaly periphery point.

8. A display apparatus that is installed in the vehicle and obtains estimation information representing a result of the estimation by the estimation section of the anomaly estimation apparatus according to claim 1, wherein the display apparatus uses the anomaly occurrence point, which is determined by the anomaly determination section to be present at the present time, as a current anomaly occurrence point, uses the anomaly periphery point, to which the estimation section estimates that transition of the anomaly is made from the current anomaly occurrence point, as a current anomaly transition point, and displays anomaly position specifying information specifying positions of the current anomaly occurrence point and the current anomaly transition point.

9. The display apparatus according to claim 8, wherein the anomaly position specifying information includes occurrence position information representing the position of the current anomaly occurrence point and transition position information representing the position of the current anomaly transition point.

10. The display apparatus according to claim 9, wherein the display apparatus displays occurrence time specifying information specifying time when an anomaly occurs at the current anomaly transition point.

11. The display apparatus according to claim 9, wherein the display apparatus highlights the current anomaly transition point having a high anomaly transition probability.

12. The display apparatus according to claim 9, wherein the display apparatus displays an avoidance route avoiding the current anomaly occurrence point and the current anomaly transition point.

13. The display apparatus according to claim 9, wherein the display apparatus displays only one the current anomaly transition point at which the vehicle installing the display apparatus is likely to arrive.

14. The display apparatus according to claim 8, wherein the anomaly position specifying information is anomaly area information representing an anomaly area including the position of the current anomaly occurrence point and the position of the current anomaly transition point.

15. The display apparatus according to claim 14, wherein the anomaly area has an anomaly occurrence area including the position of the current anomaly occurrence point and an anomaly transition area including the position of the current anomaly transition point, and the anomaly occurrence area and the anomaly transition area are distinguishably displayed.

* * * * *